US012145684B2

(12) United States Patent
Zawistowski

(10) Patent No.: US 12,145,684 B2
(45) Date of Patent: Nov. 19, 2024

(54) CONSTRAINED MULTIPLE INSTANTANEOUS VELOCITY CENTER LINKAGE ASSEMBLY FOR VEHICLE SUSPENSION

(71) Applicant: YETI CYCLING, LLC, Golden, CO (US)

(72) Inventor: Peter Zawistowski, Lakewood, CO (US)

(73) Assignee: YETI CYCLING, LLC, Golden, CO (US)

(*) Notice: Subject to any disclaimer, the term of this patent is extended or adjusted under 35 U.S.C. 154(b) by 589 days.

(21) Appl. No.: 17/116,843

(22) Filed: Dec. 9, 2020

(65) Prior Publication Data
US 2021/0188390 A1 Jun. 24, 2021

Related U.S. Application Data

(60) Provisional application No. 62/953,384, filed on Dec. 24, 2019.

(51) Int. Cl.
B62K 25/28 (2006.01)
B62K 3/02 (2006.01)
(Continued)

(52) U.S. Cl.
CPC ............. B62K 25/286 (2013.01); B62K 3/02 (2013.01); B62K 19/18 (2013.01); B62K 25/10 (2013.01)

(58) Field of Classification Search
CPC . B62K 3/02; B62K 1/18; B62K 25/10; B62K 25/26; B62K 25/286; B62K 19/18
(Continued)

(56) References Cited

U.S. PATENT DOCUMENTS 421,748 A 2/1890 McErlain
519,855 A 5/1894 Whitaker
(Continued)

FOREIGN PATENT DOCUMENTS

CA 2293366 A1 12/1998
CA 2980086 A1 6/2005
(Continued)

OTHER PUBLICATIONS

"Combined Search and Examination Report under Sections 17 and 18(3)", mailed by U.K. Intellectual Property Office on Aug. 25, 2021, for U.K. Application No. GB2102854.3, 8 pages.
(Continued)

Primary Examiner — Anne Marie M Boehler
(74) Attorney, Agent, or Firm — Dorsey & Whitney LLP

(57) ABSTRACT

Disclosed herein is structure for constraining the locations of three IVCs in a two-wheel vehicle suspension linkage. In one embodiment, the suspension linkage includes a first body (3); a second body (6); and a third body (4) operatively coupled with one another. The first body (3) includes a jointed connection with the second body (6) defining an IVC[3][6] (9), and a jointed connection to the third body (4) defining an IVC[3][4] (8). The second body (6) is operatively coupled to the third body (4) defining an IVC[4][6] (10). The first body (3) includes a first aperture, having a common axis with the IVC[3][4] (8). The second body (6) includes a second aperture having a common axis of the IVC[3][6] (9). The IVC[3][4](8), the IVC[3][6] (9) and the IVC[4][6] (10) are located within one of the first aperture or the second aperture. The IVC [3][4] (8), the IVC[3][6] (9), and the IVC[4][6] (10) are located in different positions from one another.

11 Claims, 34 Drawing Sheets

FIG. 20C

(51) Int. Cl.
    *B62K 19/18*    (2006.01)
    *B62K 25/10*    (2006.01)
(58) Field of Classification Search
    USPC ........................................................ 280/284
    See application file for complete search history.

(56) References Cited

U.S. PATENT DOCUMENTS

| | | |
|---|---|---|
| 591,306 A | 10/1897 | Tolson |
| 630,232 A | 8/1899 | Hughes et al. |
| 712,784 A | 11/1902 | Ellis |
| 724,871 A | 4/1903 | Hunter |
| 944,795 A | 12/1909 | Leet et al. |
| 1,043,269 A | 11/1912 | Stephenson |
| 1,068,583 A | 7/1913 | Harley |
| 1,168,702 A | 1/1916 | Babis, Jr. |
| 1,220,606 A | 3/1917 | Chelstrom |
| 1,261,440 A | 4/1918 | Rigby |
| 1,283,030 A | 10/1918 | Ashton |
| 1,369,356 A | 2/1921 | Rigby |
| 2,173,520 A | 9/1939 | Klatt |
| 3,803,933 A | 4/1974 | Huret et al. |
| 3,813,955 A | 6/1974 | Huret et al. |
| 3,847,028 A | 11/1974 | Bergles |
| 3,917,313 A | 11/1975 | Smith et al. |
| 3,977,697 A | 8/1976 | MacPike et al. |
| 4,058,181 A | 11/1977 | Buell |
| 4,076,271 A | 2/1978 | Doncque |
| 4,114,918 A | 9/1978 | Lutz |
| 4,241,617 A | 12/1980 | Fujimoto et al. |
| 4,265,329 A | 5/1981 | de Cortanze |
| 4,279,172 A | 7/1981 | Nagano et al. |
| 4,322,088 A | 3/1982 | Miyakoshi et al. |
| 4,360,214 A | 11/1982 | Isono |
| 4,408,674 A | 10/1983 | Boyesen |
| 4,410,196 A | 10/1983 | Ribi |
| 4,415,057 A | 11/1983 | Yamaguchi |
| 4,429,760 A | 2/1984 | Koizumi et al. |
| 4,433,747 A | 2/1984 | Offenstadt |
| 4,463,824 A | 8/1984 | Boyesen |
| 4,463,964 A | 8/1984 | Takayanagi et al. |
| 4,485,885 A | 12/1984 | Fukuchi |
| 4,500,302 A | 2/1985 | Crepin |
| 4,506,755 A | 3/1985 | Tsuchida et al. |
| 4,540,193 A | 9/1985 | Noda et al. |
| 4,544,044 A | 10/1985 | Boyesen |
| RE32,059 E | 12/1985 | Nagano |
| 4,558,761 A | 12/1985 | Boyesen |
| 4,561,519 A | 12/1985 | Omori |
| 4,574,909 A | 3/1986 | Ribi |
| 4,582,343 A | 4/1986 | Waugh |
| 4,586,913 A | 5/1986 | Nagano |
| 4,596,302 A | 6/1986 | Suzuki et al. |
| 4,619,633 A | 10/1986 | Nagano |
| 4,621,706 A | 11/1986 | Boyesen |
| 4,671,525 A | 6/1987 | Rib |
| 4,673,053 A | 6/1987 | Tanaka et al. |
| 4,679,811 A | 7/1987 | Shuler |
| 4,702,338 A | 10/1987 | Trema |
| 4,735,277 A | 4/1988 | Prince |
| 4,744,434 A | 5/1988 | Miyakoshi et al. |
| 4,789,042 A | 12/1988 | Pitts |
| 4,789,174 A | 12/1988 | Lawwill |
| RE32,924 E | 5/1989 | Nagano |
| 4,830,391 A | 5/1989 | Silk |
| 4,878,884 A | 11/1989 | Romano |
| 4,951,791 A | 8/1990 | Creixell |
| 5,011,459 A | 4/1991 | Van De Vel |
| 5,121,937 A | 6/1992 | Lawwill |
| 5,205,572 A | 4/1993 | Buell et al. |
| 5,226,674 A | 7/1993 | Buell et al. |
| 5,244,224 A | 9/1993 | Busby |
| 5,259,637 A | 11/1993 | Busby |
| 5,282,517 A | 2/1994 | Prince |
| 5,295,702 A | 3/1994 | Buell |
| 5,299,820 A | 4/1994 | Lawwill |
| 5,306,036 A | 4/1994 | Busby |
| 5,332,246 A | 7/1994 | Buell |
| 5,335,929 A | 8/1994 | Takagaki et al. |
| 5,354,085 A | 10/1994 | Gally |
| 5,356,165 A | 10/1994 | Kulhawik et al. |
| 5,360,078 A | 11/1994 | Rifenburg et al. |
| 5,370,411 A | 12/1994 | Takamiya et al. |
| 5,409,248 A | 4/1995 | Williams |
| 5,409,249 A | 4/1995 | Busby |
| 5,417,445 A | 5/1995 | Smart |
| 5,429,380 A | 7/1995 | Lawwill |
| 5,435,584 A | 7/1995 | Buell |
| 5,441,292 A | 8/1995 | Busby |
| 5,452,910 A | 9/1995 | Harris |
| 5,474,318 A | 12/1995 | Castellano |
| 5,498,013 A | 3/1996 | Hwang |
| 5,509,679 A | 4/1996 | Leitner |
| 5,553,881 A | 9/1996 | Klassen et al. |
| 5,570,896 A | 11/1996 | Collins |
| 5,597,366 A | 1/1997 | Ozaki |
| 5,607,367 A | 3/1997 | Patterson |
| 5,611,557 A | 3/1997 | Farris et al. |
| 5,628,524 A | 5/1997 | Klassen et al. |
| 5,658,001 A | 8/1997 | Blanchard |
| 5,678,837 A | 10/1997 | Leitner |
| 5,688,200 A | 11/1997 | White |
| 5,772,228 A | 6/1998 | Owyang |
| 5,791,674 A | 8/1998 | D'Aluisio et al. |
| 5,816,966 A | 10/1998 | Yang et al. |
| 5,826,899 A | 10/1998 | Klein et al. |
| 5,899,480 A | 5/1999 | Leitner |
| 5,957,473 A | 9/1999 | Lawwill |
| 6,012,999 A | 1/2000 | Patterson |
| 6,076,845 A | 6/2000 | Lawwill et al. |
| 6,086,080 A | 7/2000 | Scheffer |
| 6,102,421 A | 8/2000 | Lawwill et al. |
| 6,131,934 A | 10/2000 | Sinclair |
| 6,203,042 B1 | 3/2001 | Wilcox |
| 6,206,397 B1 | 3/2001 | Klassen et al. |
| 6,244,610 B1 | 6/2001 | Kramer-Massow |
| 6,406,048 B1 | 6/2002 | Castellano |
| 6,439,593 B1 | 8/2002 | Tseng |
| 6,450,520 B1 | 9/2002 | Girard |
| 6,488,301 B2 | 12/2002 | Klassen et al. |
| 6,543,799 B2 | 4/2003 | Miyoshi |
| 6,629,903 B1 | 10/2003 | Kondo |
| 6,712,374 B2 | 3/2004 | Assier |
| 6,793,230 B1 | 9/2004 | Cheng |
| 6,843,494 B2 | 1/2005 | Lam |
| 6,845,998 B2 | 1/2005 | Probst |
| 6,871,867 B2 | 3/2005 | Parigian |
| 6,877,591 B1 | 4/2005 | Hso |
| 6,886,846 B2 | 5/2005 | Carroll |
| 6,902,504 B2 | 6/2005 | Fukuda |
| 6,926,298 B2 | 8/2005 | Ellsworth et al. |
| 6,955,373 B2 | 10/2005 | Chang |
| 6,969,081 B2 | 11/2005 | Whyte |
| 7,025,698 B2 | 4/2006 | Wickliffe |
| 7,048,292 B2 | 5/2006 | Weagle |
| 7,066,481 B1 | 6/2006 | Soucek |
| RE39,159 E | 7/2006 | Klassen et al. |
| 7,097,190 B2 | 8/2006 | Matsumoto et al. |
| 7,100,930 B2 | 9/2006 | Saiki |
| 7,104,908 B2 | 9/2006 | Nagano |
| 7,128,329 B2 | 10/2006 | Weagle |
| 7,131,511 B2 | 11/2006 | Arnold |
| 7,210,695 B2 | 5/2007 | Griffiths |
| 7,216,883 B2 | 5/2007 | Oconnor |
| 7,296,815 B2 | 11/2007 | Ellsworth et al. |
| 7,350,797 B2 | 4/2008 | Carroll |
| 7,377,535 B2 | 5/2008 | Chamberlain |
| 7,392,999 B2 | 7/2008 | Oconnor |
| 7,395,892 B2 | 7/2008 | Alonzo |
| 7,413,208 B2 | 8/2008 | Weng |
| 7,427,077 B2 | 9/2008 | Lesage et al. |
| 7,467,803 B2 | 12/2008 | Buckley |
| 7,494,146 B2 | 2/2009 | Tseng |
| 7,556,276 B1 | 7/2009 | Dunlap |

(56) References Cited

U.S. PATENT DOCUMENTS

| | | |
|---|---|---|
| 7,581,743 B2 | 9/2009 | Graney |
| 7,635,141 B2 | 12/2009 | Oconnor |
| 7,658,394 B1 | 2/2010 | Huang |
| 7,677,347 B2 | 3/2010 | Brawn |
| 7,703,785 B2 | 4/2010 | Colegrove et al. |
| 7,703,788 B2 | 4/2010 | Tanouye et al. |
| 7,712,757 B2 | 5/2010 | Berthold |
| 7,717,212 B2 | 5/2010 | Weagle |
| 7,722,072 B2 | 5/2010 | Hoogendoorn |
| 7,722,488 B2 | 5/2010 | Kunisawa et al. |
| 7,766,135 B2 | 8/2010 | Fox |
| 7,784,810 B2 | 8/2010 | Graney |
| 7,806,422 B2 | 10/2010 | I |
| 7,815,207 B2 | 10/2010 | Currie |
| 7,828,314 B2 | 11/2010 | Weagle |
| 7,837,213 B2 | 11/2010 | Colegrove et al. |
| 7,837,214 B2 | 11/2010 | Tribotte |
| 7,891,688 B2 | 2/2011 | Chamberlain |
| 7,909,347 B2 | 3/2011 | Earle |
| 7,914,407 B2 | 3/2011 | Fukushima et al. |
| 7,934,739 B2 | 5/2011 | Domahidy |
| 7,938,424 B2 | 5/2011 | Arraiz |
| 7,938,425 B2 | 5/2011 | Chamberlain |
| 7,954,837 B2 | 6/2011 | Talavasek |
| 7,963,541 B2 | 6/2011 | Chamberlain |
| 7,971,892 B2 * | 7/2011 | Sasnowski ............ B62K 25/005 280/281.1 |
| 7,980,579 B2 | 7/2011 | Buckley |
| 8,002,301 B2 | 8/2011 | Weagle |
| 8,006,993 B1 | 8/2011 | Chamberlain |
| 8,007,383 B2 | 8/2011 | Watarai et al. |
| 8,012,052 B2 | 9/2011 | Shahana |
| 8,033,558 B2 | 10/2011 | Earle |
| 8,066,297 B2 | 11/2011 | Beale et al. |
| 8,075,009 B2 | 12/2011 | Cocalis et al. |
| 8,136,829 B1 | 3/2012 | Kang et al. |
| 8,152,191 B2 | 4/2012 | Huang et al. |
| 8,201,841 B2 | 6/2012 | Beale et al. |
| 8,272,657 B2 | 9/2012 | Graney et al. |
| 8,272,658 B2 | 9/2012 | Hoogendoorn |
| 8,286,982 B2 | 10/2012 | Plantet et al. |
| 8,303,443 B2 | 11/2012 | Wickliffe et al. |
| 8,348,295 B2 | 1/2013 | Beaulieu et al. |
| 8,376,382 B2 | 2/2013 | Twers |
| 8,382,136 B2 | 2/2013 | Beale et al. |
| 8,419,573 B2 | 4/2013 | Yamaguchi |
| 8,430,415 B2 | 4/2013 | Earle et al. |
| 8,434,776 B2 | 5/2013 | Wuthrich |
| 8,439,383 B2 | 5/2013 | Talavasek |
| 8,459,680 B2 | 6/2013 | Chamberlain |
| 8,585,070 B2 | 11/2013 | Beale |
| 8,590,914 B2 | 11/2013 | Domahidy |
| 8,622,411 B1 | 1/2014 | Chamberlain |
| 8,641,072 B2 | 2/2014 | Graney et al. |
| 8,646,797 B2 | 2/2014 | Buckley |
| 8,678,962 B2 | 3/2014 | Jordan |
| 8,696,008 B2 | 4/2014 | Hoogendoorn |
| 8,727,057 B2 | 5/2014 | Park et al. |
| 8,733,774 B2 | 5/2014 | Graney et al. |
| 8,770,360 B2 | 7/2014 | Fox |
| 8,833,785 B2 | 9/2014 | Wagner |
| 8,851,498 B2 | 10/2014 | Alsop |
| 8,882,127 B2 | 11/2014 | Colegrove et al. |
| 8,919,799 B2 | 12/2014 | Wimmer |
| 8,931,793 B2 | 1/2015 | Klieber |
| 8,932,162 B2 | 1/2015 | Emura et al. |
| 8,998,235 B2 | 4/2015 | Beale |
| 9,039,026 B2 | 5/2015 | Hudec |
| 9,056,644 B2 | 6/2015 | Hudák |
| 9,056,647 B2 | 6/2015 | Hu |
| 9,061,729 B2 | 6/2015 | Canfield et al. |
| 9,102,378 B2 | 8/2015 | Zawistowski |
| 9,102,379 B2 | 8/2015 | Capogna |
| 9,127,766 B2 | 9/2015 | Kuwayama et al. |
| 9,145,185 B1 | 9/2015 | Claro |
| 9,156,521 B2 | 10/2015 | Lumpkin |
| 9,168,977 B2 | 10/2015 | McLeay |
| 9,216,791 B2 | 12/2015 | Hudec |
| 9,221,513 B2 | 12/2015 | Hoogendoorn |
| 9,242,693 B2 | 1/2016 | Voss |
| 9,302,732 B2 | 4/2016 | Beale |
| 9,327,792 B2 | 5/2016 | Johnson et al. |
| 9,334,011 B2 | 5/2016 | Chamberlain |
| 9,376,156 B2 | 6/2016 | Chamberlain |
| 9,376,162 B2 | 6/2016 | Colegrove et al. |
| 9,457,871 B2 | 10/2016 | Kuwayama et al. |
| 9,469,369 B2 | 10/2016 | Thoma |
| 9,505,462 B2 | 11/2016 | Pasqua et al. |
| 9,561,834 B2 | 2/2017 | Zawistowski |
| 9,598,131 B2 | 3/2017 | Zusy et al. |
| 9,598,140 B2 | 3/2017 | Berthold |
| 9,637,199 B2 | 5/2017 | Pasqua et al. |
| 9,676,446 B2 | 6/2017 | Pasqua et al. |
| 9,758,217 B2 | 9/2017 | Bortoli et al. |
| 9,821,879 B2 | 11/2017 | Hoogendoorn et al. |
| 9,908,583 B2 * | 3/2018 | Matheson ................ B62K 3/02 |
| 9,919,765 B2 | 3/2018 | Wickliffe et al. |
| 9,988,122 B2 | 6/2018 | Pedretti |
| 10,011,318 B2 | 7/2018 | Beale |
| 10,099,739 B2 | 10/2018 | Nishikawa |
| 10,160,512 B2 | 12/2018 | Beale |
| 10,336,398 B2 | 7/2019 | Hudec |
| 10,343,742 B2 | 7/2019 | Zawistowski |
| 10,363,988 B2 | 7/2019 | Buckley |
| 10,640,169 B2 * | 5/2020 | Pedretti .................... B62K 3/02 |
| 10,703,433 B2 | 7/2020 | Lauer |
| 10,926,830 B2 | 2/2021 | Zawistowski |
| 11,052,964 B2 | 7/2021 | Wallace |
| 2001/0024024 A1 | 9/2001 | Klassen et al. |
| 2003/0038450 A1 | 2/2003 | Lam |
| 2003/0090082 A1 | 5/2003 | Ellsworth et al. |
| 2003/0160421 A1 | 8/2003 | Assier |
| 2003/0193163 A1 | 10/2003 | Chamberlain et al. |
| 2003/0193164 A1 | 10/2003 | Parigian |
| 2004/0046355 A1 | 3/2004 | Carroll |
| 2004/0061305 A1 | 4/2004 | Christini |
| 2004/0239071 A1 | 12/2004 | Chamberlain et al. |
| 2005/0057018 A1 | 3/2005 | Saiki |
| 2005/0067809 A2 | 3/2005 | Chamberlain |
| 2005/0067810 A1 | 3/2005 | Weagle |
| 2005/0184483 A1 | 8/2005 | Buckley |
| 2005/0253357 A1 | 11/2005 | Chang et al. |
| 2005/0285367 A1 | 12/2005 | Chang et al. |
| 2006/0022428 A1 | 2/2006 | Whyte |
| 2006/0061059 A1 | 3/2006 | Lesage et al. |
| 2006/0071442 A1 | 4/2006 | Hoogendoorn |
| 2006/0119070 A1 | 6/2006 | Weagle |
| 2006/0181053 A1 | 8/2006 | Huang et al. |
| 2006/0197306 A1 | 9/2006 | Oconnor |
| 2006/0225942 A1 | 10/2006 | Weagle |
| 2006/0231360 A1 | 10/2006 | Chen |
| 2007/0024022 A1 | 2/2007 | Weagle |
| 2007/0108725 A1 | 5/2007 | Graney |
| 2007/0194550 A1 | 8/2007 | Wadelton |
| 2007/0210555 A1 | 9/2007 | Oconnor |
| 2008/0054595 A1 | 3/2008 | Lu |
| 2008/0067772 A1 | 3/2008 | Weagle |
| 2008/0217882 A1 | 9/2008 | Beaulieu et al. |
| 2008/0238030 A1 | 10/2008 | Tseng |
| 2008/0238031 A1 | 10/2008 | Tseng |
| 2008/0252040 A1 | 10/2008 | Colegrove et al. |
| 2008/0258427 A1 | 10/2008 | Buckley |
| 2008/0303242 A1 | 12/2008 | Oconnor |
| 2009/0001685 A1 | 1/2009 | Talavasek et al. |
| 2009/0026728 A1 | 1/2009 | Domahidy |
| 2009/0072512 A1 | 3/2009 | Earle |
| 2009/0250897 A1 | 10/2009 | Tanouye et al. |
| 2009/0261556 A1 | 10/2009 | Beale et al. |
| 2009/0261557 A1 | 10/2009 | Beale et al. |
| 2009/0278331 A1 | 11/2009 | Graney |
| 2009/0283986 A1 | 11/2009 | Falke |
| 2009/0322055 A1 | 12/2009 | Arraiz |
| 2010/0059965 A1 | 3/2010 | Earle |
| 2010/0102531 A1 | 4/2010 | Graney et al. |

(56) References Cited

U.S. PATENT DOCUMENTS

| | | |
|---|---|---|
| 2010/0109282 A1 | 5/2010 | Weagle |
| 2010/0127473 A1 | 5/2010 | Cocalis et al. |
| 2010/0156066 A1 | 6/2010 | Oconnor |
| 2010/0327553 A1 | 12/2010 | Talavasek |
| 2010/0327554 A1 | 12/2010 | Talavasek |
| 2010/0327556 A1 | 12/2010 | Chamberlain |
| 2011/0025015 A1 | 2/2011 | Colegrove et al. |
| 2011/0115181 A1 | 5/2011 | Weagle |
| 2011/0140387 A1 | 6/2011 | Andal et al. |
| 2011/0175310 A1 | 7/2011 | Lewis |
| 2011/0187078 A1 | 8/2011 | Higgon |
| 2011/0233892 A1 | 9/2011 | Domahidy |
| 2011/0233893 A1 | 9/2011 | Buckley |
| 2011/0275256 A1 | 11/2011 | Gibbs et al. |
| 2011/0285106 A1 | 11/2011 | Talavasek |
| 2012/0223504 A1 | 9/2012 | Antonot |
| 2012/0228850 A1 | 9/2012 | Tseng |
| 2012/0280470 A1 | 11/2012 | Colegrove et al. |
| 2012/0299268 A1 | 11/2012 | Chamberlain et al. |
| 2013/0001918 A1 | 1/2013 | Graney et al. |
| 2013/0001919 A1 | 1/2013 | Graney et al. |
| 2013/0093160 A1 | 4/2013 | Alsop |
| 2013/0096781 A1 | 4/2013 | Reichenbach et al. |
| 2013/0214503 A1 | 8/2013 | Chiuppani |
| 2013/0249181 A1 | 9/2013 | Becker et al. |
| 2013/0249188 A1 | 9/2013 | Beale |
| 2013/0285346 A1 | 10/2013 | Wimmer |
| 2014/0001729 A1 | 1/2014 | Hudec |
| 2014/0015220 A1 | 1/2014 | Talavasek |
| 2014/0042726 A1 | 2/2014 | Canfield et al. |
| 2014/0060950 A1 | 3/2014 | Beutner |
| 2014/0109728 A1 | 4/2014 | Mcrorie, III |
| 2014/0167385 A1 | 6/2014 | Gogo et al. |
| 2014/0217697 A1 | 8/2014 | Buckley |
| 2014/0318306 A1 | 10/2014 | Tetsuka |
| 2015/0001829 A1 | 1/2015 | Berthold |
| 2015/0035241 A1 | 2/2015 | McLeay |
| 2015/0054250 A1 | 2/2015 | Hu |
| 2015/0115569 A1 | 4/2015 | Matheson et al. |
| 2015/0175238 A1 | 6/2015 | Lumpkin |
| 2015/0183487 A1 | 7/2015 | Tsai |
| 2015/0191213 A1 | 7/2015 | Beale |
| 2015/0251724 A1 | 9/2015 | Hudec |
| 2015/0360743 A1 | 12/2015 | Oconnor |
| 2016/0083042 A1 | 3/2016 | Voss |
| 2016/0257371 A1* | 9/2016 | Droux ................. B62K 25/286 |
| 2016/0272273 A1 | 9/2016 | Colegrove et al. |
| 2016/0280317 A1 | 9/2016 | Hoogendoorn |
| 2016/0311493 A1 | 10/2016 | Scheffer |
| 2016/0375956 A1 | 12/2016 | Talavasek et al. |
| 2017/0101152 A1* | 4/2017 | Pedretti ................. B62K 25/30 |
| 2017/0151996 A1 | 6/2017 | Southall |
| 2018/0037295 A1 | 2/2018 | Beale |
| 2018/0072378 A1 | 3/2018 | Talavasek et al. |
| 2018/0072379 A1 | 3/2018 | Talavasek et al. |
| 2018/0072380 A1 | 3/2018 | Talavasek et al. |
| 2018/0140387 A1 | 5/2018 | Richard |
| 2018/0148123 A1 | 5/2018 | Neilson |
| 2018/0229798 A1 | 8/2018 | Hoogendoorn et al. |
| 2018/0265165 A1 | 9/2018 | Zawistowski |
| 2018/0297661 A1 | 10/2018 | Beale |
| 2018/0304958 A1* | 10/2018 | Madsen ................ B62K 25/286 |
| 2019/0039682 A1 | 2/2019 | Zawistowski |
| 2019/0144069 A1 | 5/2019 | Beale |
| 2019/0300096 A1 | 10/2019 | Chamberlain et al. |
| 2019/0300097 A1 | 10/2019 | Chamberlain et al. |
| 2020/0070930 A1 | 3/2020 | Buckley |
| 2020/0247500 A1 | 8/2020 | Zawistowski |
| 2021/0046996 A1 | 2/2021 | Beale |
| 2021/0269117 A1 | 9/2021 | Zawistowski |
| 2022/0153381 A1 | 5/2022 | Zawistowski et al. |
| 2022/0306240 A1 | 9/2022 | Talavasek et al. |

FOREIGN PATENT DOCUMENTS

| | | |
|---|---|---|
| DE | 692011 C | 6/1940 |
| DE | 9405076 U1 | 5/1994 |
| DE | 9416803 U1 | 12/1994 |
| DE | 4435482 A1 | 4/1996 |
| DE | 102019002456 A1 | 10/2019 |
| DE | 102021104753 A1 | 9/2021 |
| EP | 0422324 A1 | 4/1991 |
| EP | 0723907 B1 | 7/1998 |
| EP | 0941917 A2 | 9/1999 |
| EP | 1026073 A1 | 8/2000 |
| EP | 1060979 A2 | 12/2000 |
| EP | 1238900 A2 | 9/2002 |
| EP | 2540609 A1 | 1/2013 |
| EP | 2706002 A1 | 3/2014 |
| EP | 1799534 B1 | 8/2014 |
| EP | 2812234 A1 | 12/2014 |
| FR | 541520 A | 7/1922 |
| FR | 933079 A | 4/1948 |
| FR | 2774966 A1 | 8/1999 |
| GB | 17336 | 10/1913 |
| GB | 2086319 A | 5/1982 |
| GB | 2338216 A | 12/1999 |
| GB | 2522461 A | 7/2015 |
| GB | 2525870 B | 1/2017 |
| GB | 2594780 B | 7/2022 |
| JP | H0725378 A | 1/1995 |
| WO | 9422710 A1 | 10/1994 |
| WO | 9803390 A1 | 1/1998 |
| WO | 9818671 A1 | 5/1998 |
| WO | 9856645 A1 | 12/1998 |
| WO | 199944880 | 9/1999 |
| WO | 9965760 A1 | 12/1999 |
| WO | 9944880 A9 | 1/2000 |
| WO | 03010042 A1 | 2/2003 |
| WO | 03018392 A1 | 3/2003 |
| WO | 03021129 A1 | 3/2003 |
| WO | 2004045940 A2 | 6/2004 |
| WO | 2005030564 A2 | 4/2005 |
| WO | 2005030565 A1 | 4/2005 |
| WO | 2005090149 A1 | 9/2005 |
| WO | 2006005687 A1 | 1/2006 |
| WO | 2006032052 A2 | 3/2006 |
| WO | 2006061052 A1 | 6/2006 |
| WO | 2008025950 A1 | 3/2008 |
| WO | 2008130336 A1 | 10/2008 |
| WO | 2009121936 A1 | 10/2009 |
| WO | 2010033174 A1 | 3/2010 |
| WO | 2010103057 A1 | 9/2010 |
| WO | 2010121267 A1 | 10/2010 |
| WO | 2012024697 A1 | 2/2012 |
| WO | 2012027900 A1 | 3/2012 |
| WO | 2012063098 A1 | 5/2012 |
| WO | 2012122634 A1 | 9/2012 |
| WO | 2013028138 A2 | 2/2013 |
| WO | 2013078436 A1 | 5/2013 |
| WO | 2013119616 A1 | 8/2013 |
| WO | 2013142855 A2 | 9/2013 |
| WO | 2013192622 A1 | 12/2013 |
| WO | 2014009019 A1 | 1/2014 |
| WO | 2014029759 A1 | 2/2014 |
| WO | 2014202890 A1 | 12/2014 |
| WO | 2015004490 A1 | 1/2015 |
| WO | 2015196242 A1 | 12/2015 |
| WO | 2016036237 A1 | 3/2016 |
| WO | 2016097433 A1 | 6/2016 |
| WO | 2016134471 A1 | 9/2016 |
| WO | 2018027192 A1 | 2/2018 |
| WO | 2018170505 A1 | 9/2018 |
| WO | 2019010394 A1 | 1/2019 |
| WO | 2021133996 A1 | 7/2021 |
| WO | 2021174088 A1 | 9/2021 |

OTHER PUBLICATIONS

"International Search Report & Written Opinion", mailed on Jul. 16, 2021, for PCT Application No. PCT/US2021/020034, 16 pages.

(56) References Cited

OTHER PUBLICATIONS

"Netherlands Patent Office, Written Opinion and Search Report mailed Sep. 24, 2021", in Dutch and English, for Netherlands Application No. 2027223, 17 pages.
"U.K. Intellectual Property Office, "Combined Search and Examination Report under Sections 17 an 18(3),"", mailed Apr. 21, 2021, for U.K. Application No. GB2020235.4, 6 pages.
Worsey, "Forbidden Druid Review—Are high pivots just for downhill?", Enduro, [online], Mar. 4, 2019 [retrieved on Jun. 16, 2021], From Internet: <url: https://enduro-mtb.com/en/fobidden-druid-review/>; 15 pages.
Aston, Paul, "Canyon Sender—Review", https://www.pinkbike.com/news/canyon-sender-review-2017.html, Mar. 13, 2017, 33 pages.
Aston, Paul, "Robot Bike Co R160—First Look", https://www.pinkbike.com/news/robot-bike-co-r160-first-look-2016.html (Accessed Jun. 30, 2020), May 27, 2016, 39 pages.
Author Unknown, "Sarrus Linkage", Wikipedia, http://en.wikipedia.org/wiki/Sarrus_linkage, 1 page, at least as early as Aug. 20, 2010.
Chen, "Design of Structural Mechanisms", A dissertation submitted for the degree of Doctor of Philosophy in the Department of Engineering Science at the University of Oxford, St Hugh's College, 2003, 160 Pages.
Cunningham, Richard, "First Look: Felt 2014", https://www.pinkbike.com/news/First-Look-Felt-2014.html (Accessed Jun. 30, 2020), Aug. 7, 2013, 20 pages.
DB Bikes, "Felt Compulsion 50 Mountain Bike 2017", https://downhillbikesforsale.com/products/Felt-Compulsion-50-Mountain-Bike-2017.html, (Accessed Jun. 30, 20), 9 pages.
EP, "European Extended Search Report", Application No. 12851566.5, May 28, 2015, 7 pages.
EP, "Extended European Search Report", Application No. 11818903.4, Sep. 15, 2015, 8 pages.
EP, "Supplementary Search Report", Application No. 05798319.9, Dec. 11, 2009, 1 page.
Foale, Tony, "Motorcycle Handling and Chassis Design: The Art and Science", https://epdf.pub/motorcycle-handling-and-chassis-design-the-art-and-science.html, Mar. 2002, 498 pages.
Giant Bicycles, "Anthem Advanced Pro 29 1", https://www.giant-bicycles.com/us/anthem-advanced-pro-29-1-2021, (Accessed Sep. 14, 2020), 8 pages.
Kavik Bicycles, "Kavik Regen Suspension", (Accessed Jun. 30, 20), 2 pages.
Li, "Movable Spatial 6R Linkages", XP055249075, Retrieved from the Internet on Oct. 13, 2016: URL:http://people.ricam.oeaw.ac.at/z.li/publications/talks/6.pdf, Oct. 2, 2013, 48 Pages.
Mountain Bike Action, "Bike Test: Felt Compulsion 1 27.5", https://mbaction.com/oct-felt-compulsion-1-27-5/, (Accessed Jun. 30, 2020), 10 pages.
Overholt, Zach, Bikerumor , "IB17: Tantrum Cycles makes it to production, gets noticed by Adventure Capitalists", https://bikerumor.com/2017/09/26/ib17-tantrum-cycles-makes-it-to-production-gets-noticed-by-adventure-capitalists/ (Accessed Jun. 30, 2020), Sep. 26, 2017, 8 pages.
PCT, "International Search Report", Application No. PCT/US2020/016265, Jun. 19, 2020, 18 pages.
PCT, "International Search Report and Written Opinion", Application No. PCT/US2011/048696, Dec. 14, 2011, 10 pages.
PCT, "International Search Report and Written Opinion", Application No. PCT/US2015/065090, Feb. 12, 2016, 11 pages.
PCT, "International Search Report and Written Opinion", Application No. PCT/US2012/066427, Jan. 18, 2013, 12 pages.
PCT, "International Search Report and Written Opinion", Application No. PCT/US2018/041054, Sep. 28, 2018, 12 pages.
PCT, "International Search Report and Written Opinion", Application No. PCT/US2018/023124, Aug. 2, 2018, 14 pages.
PCT, "International Search Report and Written Opinion", Application No. PCT/US2005/33410, Nov. 29, 2006, 5 pages.
Ridemonkey, "how many links could a dw link if a dw could link links?", https://ridemonkey.bikemag.com/threads/how-many-links-could-a-dw-link-if-a-dw-could-link-links.276645/ (Accessed Jun. 30, 2020), May 27, 2016, 8 pages.
Roberts, Dan , "First Ride: 2021 Canyon Sender CFR", https://www.pinkbike.com/news/first-ride-2021-canyon-sender-cfr.html, Aug. 11, 2020, 23 pages.
Sarrut, "Note Sur La Transformation Des Mouvements Rectilignes Alternatifs", Académie des Sciences, 36, 1036-1038, 1853, 5 Pages.
U.S. Patent and Trademark Office, "U.S. Appl. No. 62/815,675", filed Mar. 8, 2019, Mar. 8, 2019,.
U.S. Patent and Trademark Office, "U.S. Appl. No. 62/833,496", filed Apr. 12, 2019, Apr. 12, 2019,.
U.S. Patent and Trademark Office, "U.S. Appl. No. 62/867,169", filed Jun. 26, 2019, Jun. 26, 2019.
Zawistowski, "Quantifying Wheel Path", Think Turquoise, http://www.yeticycles.com/blog/?p=237 [Retrieved from the Internet on Jul. 27, 2011], Jul. 18, 2010, 4 Pages.
Brown, "Preview: Nicolai Bikes Available in the U.S.: The belt-drive, big-hit bikes will be distributed by Nicolai USA," Bike Mag, Jun. 3, 2014, 9 pages.
Overholt, "SOC 14: Effigear Calls in the Cavalerie for new Gear Box Bikes in the US," Bike Rumor, Apr. 23, 2014, 16 pages.
U.S. Patent and Trademark Office, Final Office Action mailed on Jul. 22, 2021, for U.S. Appl. No. 15/925,165, 15 pages.
"European Patent Office, EP Extended Search Report", mailed Sep. 21, 2022, for European Application No. 20747607.8, 2 pages.
"Netherlands Intellectual Property Office, Search Report and Opinion", issued Nov. 15, 2021, for Dutch Application No. 2027668, 24 pages.
"Spotted: A New Commencal Supreme Breaks Cover at the Portugal Cup", Article published on Mar. 7, 2022.
"U.K. Intellectual Property Office", Search Report mailed Jul. 7, 2022, for U.K. Application No. GB2208682.1, 3 pages.
"What's Going on With Commencal's Prototype DH Race Bike?", Article published on Jun. 9, 2021.
European Patent Office , "Communication Pursuant to Article 94(3) EPC", mailed Jul. 8, 2022, for European Application No. 18768549.0, 6 pages.
European Patent Office , "Extended European Search Report", mailed Oct. 4, 2022, for European Application No. 20747607.8, 6 pages.
German Patent Office , "Examination Notice and Search Report", mailed Apr. 13, 2022, for German Application No. 10 2020 134 843.6, 7 pages.
U.S. Patent and Trademark Office , "Non-Final Office Action", mailed Sep. 16, 2022, for U.S. Appl. No. 16/705,049, 10 pages.
"Extended European Search Report for EP 18768549.0", mailed Feb. 8, 2021.
gb ipo, "Combined Search and Exam Report", App. No. 2020235.4, Apr. 21, 2021, 6 pages.
MTBR: Mountain Bike Review Forum, "Jayem Discussion Starter #1—Knolly Suing Intense for Building Bikes with Seat-tubes in Front of the BB", https://www.mtbr.com/threads/knolly-suing-intense-for-building-bikes-with-seat-tubes-in-front-of-the-bb.1173867/, Jan. 2021, 16 pages.
Nicolai Maschinenbau, "History of Nicolai," Gesellschaft für Zweirad und Maschinenbau mbh, at least as early as 1995, 3 pages.
Nicolai, "Nicolai Trombone Frame," at least as early as 1995, 6 pages.
Netherlands Patent Office, "Written Opinion and Search Report," mailed Feb. 22, 2023, for Dutch Application No. 2029897, Dutch with partial English translation, 12 pages.
Aston, Paul, "Robot Bike Co R160 Custom—Review," Outside Magazine, Oct. 17, 2016, 46 pages.

\* cited by examiner

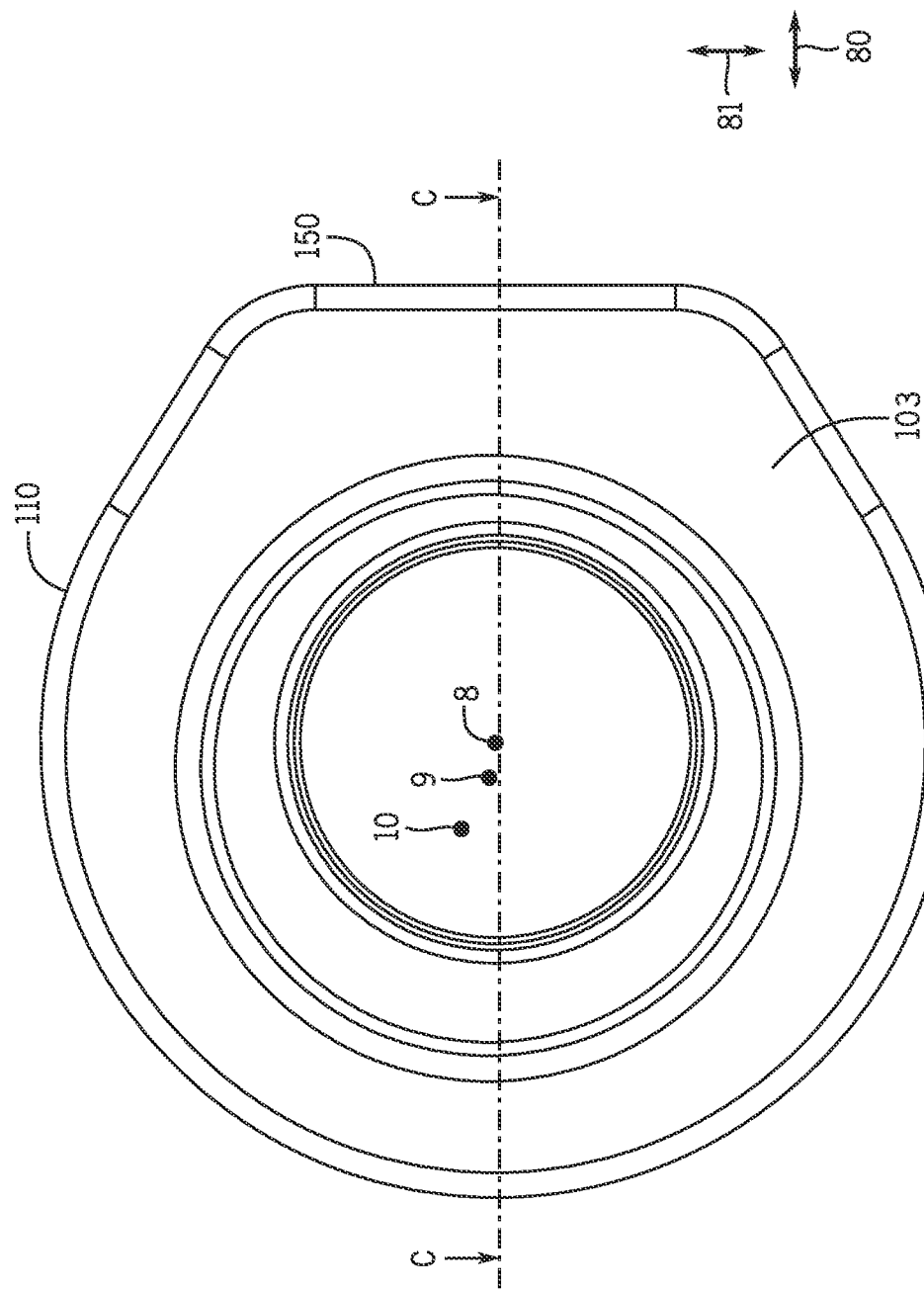

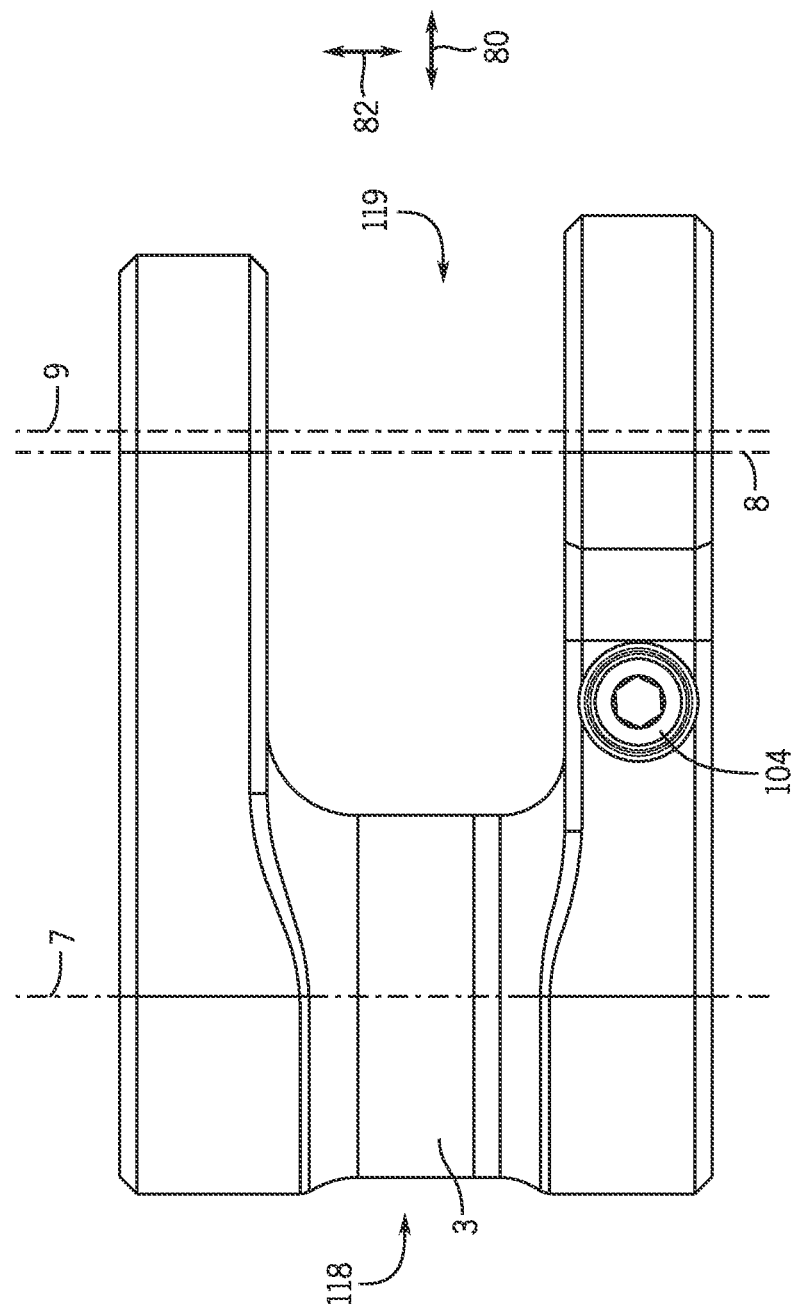

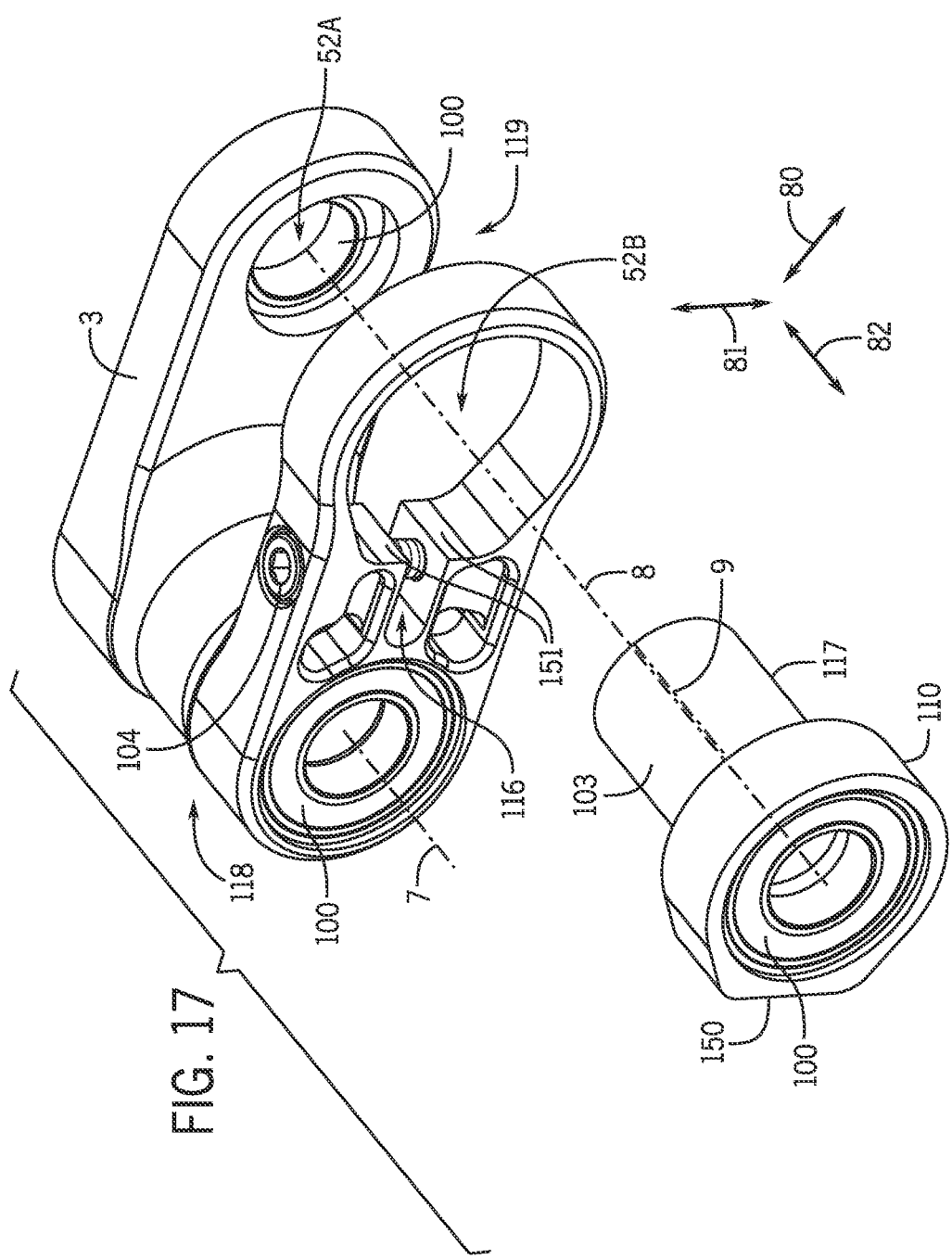

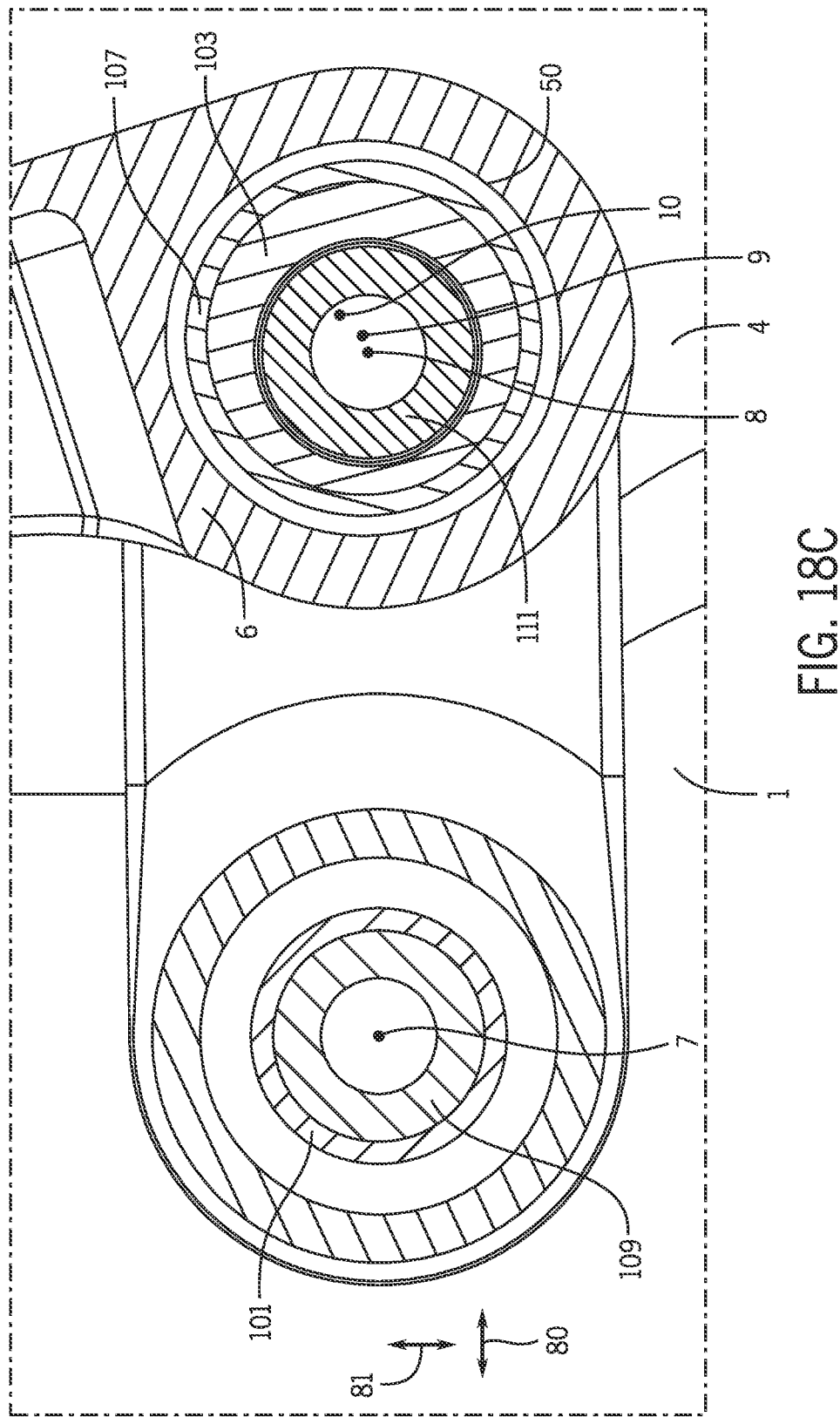

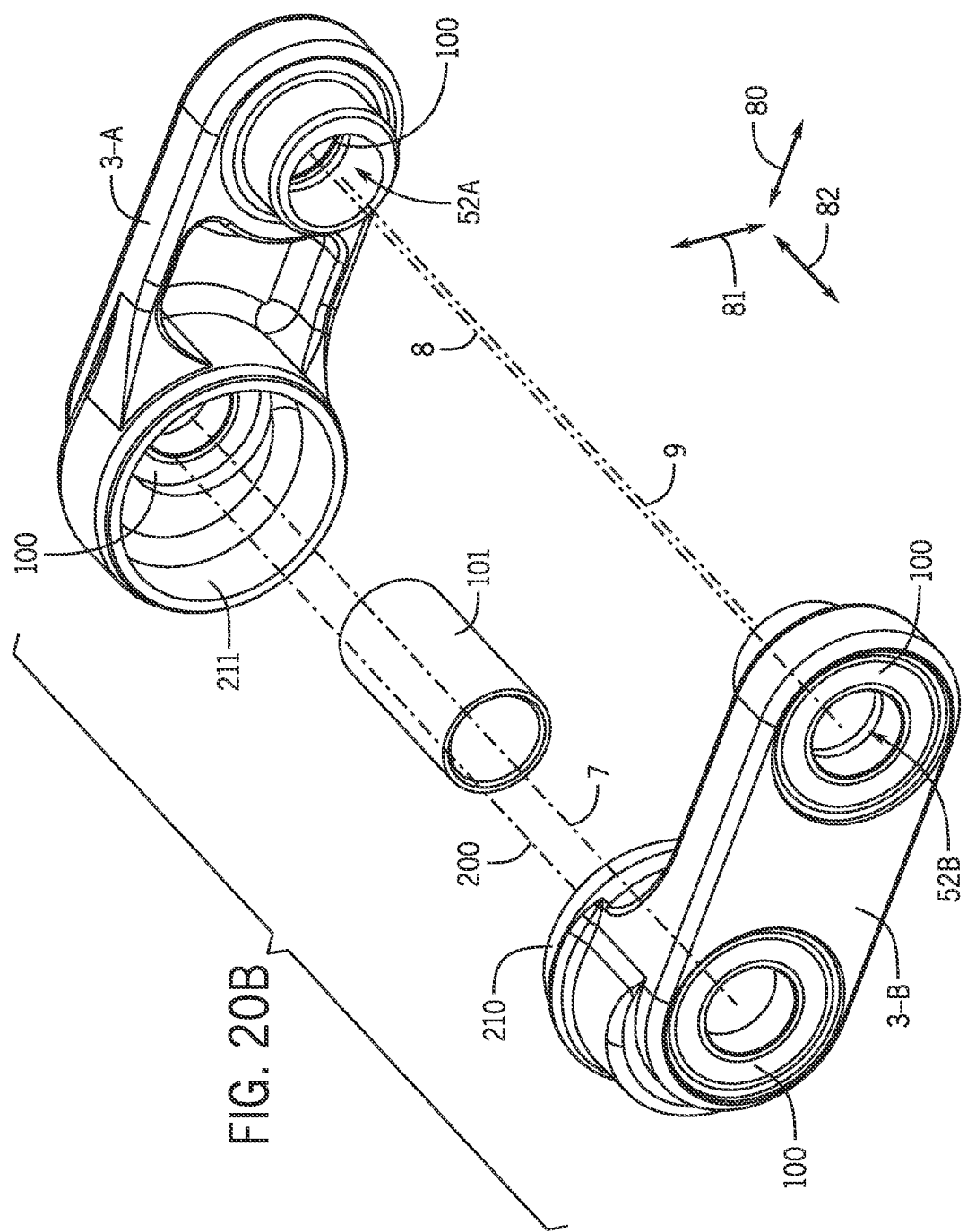

CONSTRAINED MULTIPLE INSTANTANEOUS VELOCITY CENTER LINKAGE ASSEMBLY FOR VEHICLE SUSPENSION

This application claims the benefit of priority pursuant to 35 U.S.C. § 119(e) of U.S. provisional patent application No. 62/953,384, filed 24 Dec. 2019, entitled "CONSTRAINED INSTANTANEOUS VELOCITY CENTER LINKAGE ASSEMBLY FOR VEHICLE SUSPENSION," which is hereby incorporated by reference herein in its entirety.

TECHNICAL FIELD

The technology disclosed herein relates to vehicle suspension linkages, and more particularly to a linkage member assembly that packages three Instantaneous velocity centers [IVCs], with two of the IVCs in close proximity with one another.

BACKGROUND

Vehicle suspension terminology depends upon the reference frame considered. Consider a static vehicle that has two wheels, each of which are supported by the ground and a suspended body, which is operatively coupled to each wheel. In a two-wheel vehicle, such as a bicycle, electric bicycle or pedelec or motorcycle, etc. there is typically one rear wheel known as the driven wheel, which includes a driven cog. There is also one front wheel. A driving cog is operatively coupled to the suspended body. A driving chain or belt connects the driven cog and the driving cog. The driving cog, which is connected to the driven cog via the driving chain/belt, is rotated by a crank under human power, or by a motor, or by combined motor and human power. The reaction of the driven wheel and the ground causes the vehicle to move or accelerate forward, or in the general direction from the rear wheel to the front wheel. Rearward is then defined as the general direction from the front wheel to the rear wheel.

A linkage operatively couples the suspended body and the driven wheel. A linkage may be composed of multiple bodies (often referred to as links or members) that are operatively coupled to each other in a manner that allows the bodies to flex, cam, rotate or translate relative to one another. The linkage constrains the movement in which the driven wheel and brake may travel relative to the suspended body. A combination of damper(s) and/or spring(s) is/are typically arranged to react to relative motion between the suspended body and the driven wheel. The linkage is highly responsible for the vehicle's dynamic response to acceleration and deceleration as well as the mechanical advantage over the shock/damper.

The information included in this Background section of the specification, including any references cited herein and any description or discussion thereof, is included for technical reference purposes and is not to be regarded as subject matter by which the scope of the invention as defined in the claims is to be bound.

SUMMARY

The technology disclosed herein relates to vehicle suspension linkages, and an assembly method to package three instantaneous velocity centers [IVCs], which are further explained herein, in proximity. The ability for three IVCs to be located in proximity near each other provide several kinematic tuning advantages as well as frame structure benefits.

The technology disclosed herein relates to vehicle suspension linkages. In one embodiment, a two-wheel vehicle suspension linkage is provided. The suspension includes a suspended body-1, a seat stay body-2, a link body-3, a chain stay body-4, a link body-5, and a link body-6 operatively coupled with one another. The link body-3 includes jointed connections with the suspended body-1 defining an IVC[1][3], the chain stay body-4 defining an IVC[3][4], and the link body-6 defining an IVC[3][6]. The chain stay body-4 includes an additional jointed connection with the seat stay body-2 defining an IVC[2][4]. The link body-5 includes additional jointed connections with suspended body-1 defining an IVC[1][5], seat stay body-2 defining an IVC[2][5], and the link body-6 defining an IVC[5][6]. This arrangement defines seven "physical" IVCs known as PIVCs out of the 15 total IVCs in the system: PIVC[1][3], PIVC[1][5], PIVC[2][4], PIVC[2][5], PIVC[3][4], PIVC[3][6], PIVC[5][6]; The relationship between the chain stay body-4 and the link body-6 may define "virtual" IVC[4][6], one of 8 "virtual" IVCs which are further explained in the specification. The suspension includes a damper unit configured to resist movement between two or more of the suspended body-1, seat stay body-2, link body-3, chain stay body-4, link body-5, or link body-6. The damper unit may include an extension body or bodies to increase its effective length.

In some embodiments, two alternative assemblies denoted as embodiment 1 and embodiment 2, are disclosed that enable PIVC[3][4], PIVC[3][6] and IVC[4][6] to be located in proximity. Examples of embodiment 1 are shown in FIGS. 1-18C. Examples of embodiment 2 are shown in FIGS. 19A-21C.

In embodiment 1, link body-3 is composed of a single body with a feature axis defining PIVC[3][4], wherein a second body with a feature axis that defines PIVC[3][6] is disposed so that PIVC[3][4] and PIVC[3][6] are not collinear. For example, the PIVC[3][6] may be keyed and clamped. IVC[4][6] is located in proximity to PIVC[3][4] and PIVC[3][6].

In embodiment 2, link body-3 is composed of two bodies that when assembled function as a single rigid body with a feature axis defining PIVC[3][4] and a feature axis that defines PIVC[3][6] so that PIVC[3][4] and PIVC[3][6] are not collinear. IVC[4][6] is located in proximity to PIVC[3][4] and [3][6] due to the arrangement of the linkage described above.

In one aspect, a structure for constraining the locations of three instantaneous velocity centers (IVCs) in a two-wheel vehicle suspension linkage is disclosed. The structure includes a first body (3); a second body (6); and a third body (4) operatively coupled with one another. The first body (3) includes a jointed connection with the second body (6) defining an IVC[3][6] (9), and a jointed connection to the third body (4) defining an IVC[3][4] (8), the second body (6) is operatively coupled to the third body (4) defining an IVC[4][6] (10). The first body (3) includes a first aperture, having a common axis with the IVC[3][4] (8), the second body (6) includes a second aperture having a common axis of the IVC[3][6] (9), the IVC[3][4] (8), the IVC[3][6] (9) and the IVC[4][6] (10) are located within one of the first aperture or the second aperture, and the IVC[3][4] (8), the IVC[3][6] (9), and the IVC[4][6] (10) are located in different positions from one another.

In some embodiments, the IVC[3][4] (8), the IVC[3][6] (9) and the IVC[4][6] (10) are located within the first aperture or the second aperture as the structure moves from an at least partially extended state to an at least partially compressed state.

In some embodiments, a size of the first aperture is different than a size of the second aperture.

In some embodiments, the first body (3) includes two link bodies coupled to one another to form a single, rigid body.

In some embodiments, the first body (3) includes a slotted portion defining a pair of deformable opposing jaws.

In some embodiments, one of the first body (3), second body (6), or the third body (4) is a chain stay.

In some embodiments, one of the first body (3), second body (6), or the third body (4) is a suspended body.

In some embodiments, one of the first body (3), second body (6), or the third body (4) is a seat stay.

In some embodiments, the size of the first aperture is larger than the size of the second aperture.

In some embodiments, the size of the second aperture is larger than the size of the first aperture.

The structure may also include where the two link bodies each include respective first circular interfaces that define a first axis when the two link bodies are coupled together by the respective first circular interfaces, the two link bodies each include respective second circular interfaces that define a second axis offset from the first axis when the two bodies are coupled together by the respective first circular interfaces, and a fastener is coupled to the respective second circular interfaces through the second axis such that the two link bodies are keyed together as a single rigid body.

The structure may also include where a first link body of the two link bodies includes a third aperture that defines the IVC[3][4] (8) and a second link body of the two link bodies includes a fourth aperture that defines the IVC[3][6] (9); where the second link body is keyed to the first link body to define a position of the IVC[3][4] (8) relative to the IVC[3][6] (9).

The structure may also include where the opposing deformable jaws are configured to grip a shaft of a bearing.

In one aspect, a bicycle suspension component includes a support member extensive in longitudinal, lateral, and transverse directions. The support member includes a first mechanical pivot having a first pivot mechanism defining a first pivot axis around which the first pivot mechanism is pivotable. The first pivot mechanism having a first pivot envelope that the first pivot mechanism occupies in the longitudinal and lateral directions. The support member includes a second mechanical pivot having a second pivot mechanism defining a second pivot axis around which the second pivot mechanism is pivotable. The second pivot mechanism has a second pivot envelope that the second pivot mechanism occupies in the longitudinal and lateral directions. The support member includes a third mechanical pivot having a third pivot mechanism defining a third pivot axis around which the first pivot mechanism is pivotable. The first pivot envelope and the second pivot envelope overlap in at least one of longitudinal and lateral directions without the first pivot axis and the second pivot axis being the same axis.

In some embodiments, the first pivot mechanism includes an inner surface configured to receive a first bearing forming the first mechanical pivot with another suspension component.

In some embodiments, the first pivot mechanism and the second pivot mechanism form a rigid connected body member defining a first axis and a second axis, where the first axis is offset from the second axis.

In some embodiments, the second pivot mechanism includes an exterior surface for engaging with an inner race of a second bearing forming the second mechanical pivot with another suspension component, where the second pivot envelope overlaps with the first pivot envelope.

In some embodiments, the first pivot mechanism is transversely offset from the second pivot mechanism.

In some embodiments, a bicycle may include a suspension component disclosed herein. The bicycle may also include further include a first body (3), a second body (6), and a third body (4) coupled to the first mechanical pivot, the second mechanical pivot, and the third mechanical pivot, respectively.

The bicycle may also include where the first body (3) includes a suspended body.

The bicycle may also include where the third body (4) includes a chain stay.

The bicycle may also include where the second body (6) is coupled to a second suspension linkage member The bicycle may also include where the second linkage member is a seat stay.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIG. 15A shows a side view of the eccentric shaft body-103 of embodiment 1 and cross section line C-C.

FIG. 16 shows a top view of link body-3 of embodiment 1

FIG. 17 shows an isometric view of embodiment 1 with eccentric shaft body 103 and bearing body-100 exploded and several bodies hidden for clarity.

FIG. 18C is a cross section of FIG. 18B taken along section line D-D.

FIG. 20B shows an isometric exploded view of embodiment 2 with several bodies removed for clarity.

DETAILED DESCRIPTION

Figure 1A:
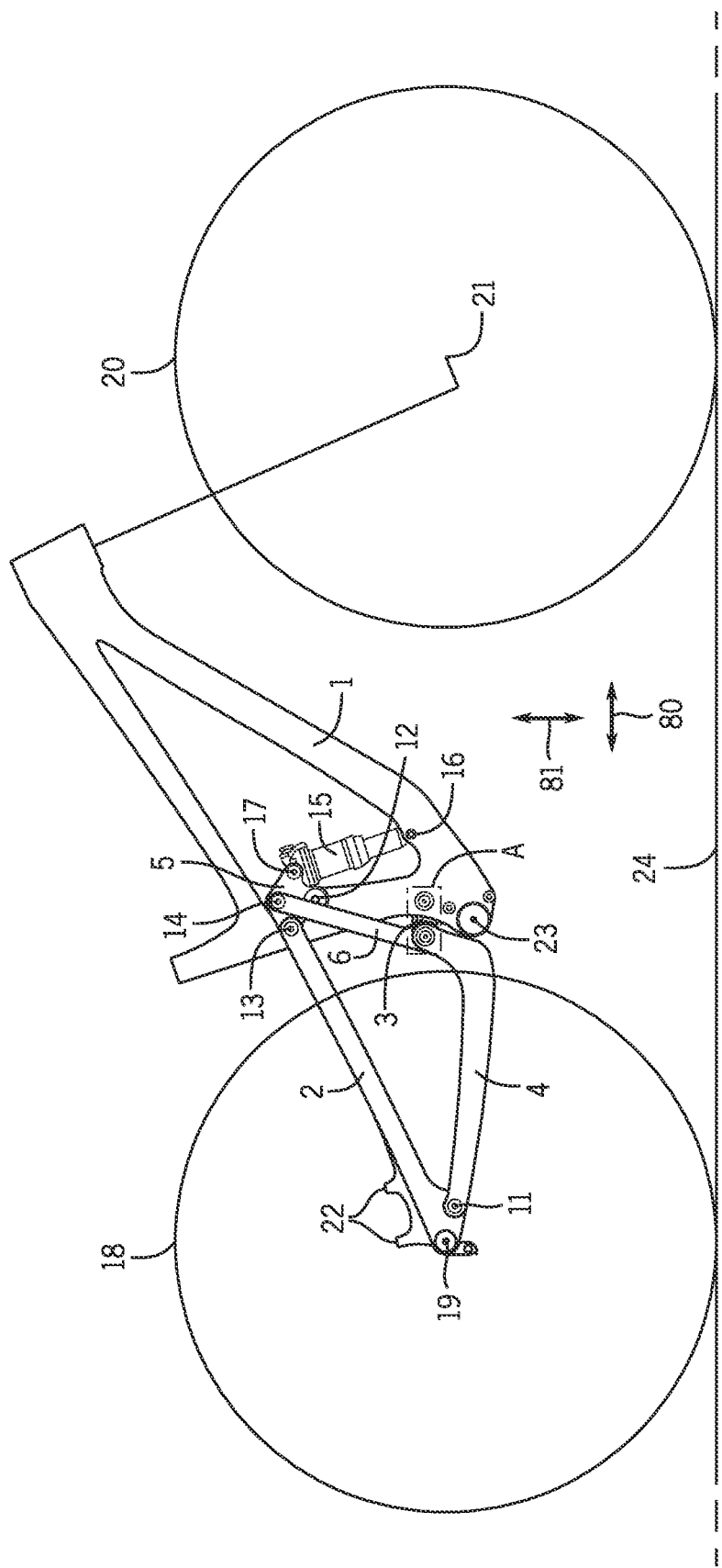
FIG. 1A shows a side view of a 6-bar suspension linkage in the extended state with the noted location of detail view A.

Disclosed herein is a system or linkage that operatively couples a suspended body to a driven wheel. In accordance with the various embodiments provided herein, the suspension system linkage improves suspension performance based on the interrelationships of its linkage bodies and the related instantaneous velocity centers (IVCs). In one example, the linkage has 15 IVCs wherein the linkage bodies are assembled so that three IVCs can be in proximity. This is typically difficult to achieve since the size of hardware typical for a two-wheeled vehicle is inhibiting. In particular, the linkage may be a 6-bar linkage. In other examples the linkage may have fewer, or greater numbers of IVCs depending on the linkage design.

Various theories, methods, algorithms or analysis systems are provided herein. These systems are provided for better understanding of the structures and configurations described. Unless specifically claimed, the systems are not limiting regardless of current accuracy or subsequent clarifications or understandings of the structures and configurations that may be determined by persons of ordinary skill in the art.

Accordingly, provided herein are various methods, systems, algorithms, and/or frameworks suitable for analyzing suspension systems. These methods, systems, algorithms, and/or frameworks have been disclosed in detail in patent applications US20190039682A1, U.S. Ser. Nos. 62/815,675, 62/833,496 and 62/867,169, which are incorporated herein by reference in their entireties for all purposes. The same analysis methodology is used in this application. For example, various methods are provided for calculating unknown IVCs of a linkage for a suspension system. Such analytical methods are provided for fuller understanding of the various mechanisms discussed herein. For example, a triangular method may be used to determine an unknown IVC of interest. Additionally, or alternatively, plotting the positional relationships of IVCs in a linkage of a suspension can be utilized. Accordingly, the positions of IVCs may change depending on the configuration of the system. A particular IVC may be in a different position depending on whether the system is in a compressed or extended state. IVC migration paths can be determined and vectors running tangential to such migration paths can be analyzed. Thus, the interrelationships between IVCs can be analyzed, allowing for a mathematical analysis of the movement of the linkage subsystem. Finally, methods to calculate anti-squat, anti-rise, and leverage rate is detailed.

The leverage rate (LR) is the ratio of the change in vertical wheel travel to the change in shock stroke. A plot can be generated to represent the instantaneous leverage rate from the fully extended to the fully compressed state. The motion ratio (MR) is the inverse of the LR. The higher the leverage rate the greater the mechanical advantage on the shock/damper and the lower the force required to compress the shock. The lower the leverage rate the lesser the mechanical advantage on the shock/damper and the higher the force required to compress the shock.

It is understood that throughout this disclosure the relationship of various linkages are described with respect to characteristics of those linkages. One analysis system useful for assessing these relationships is the Mobility Analysis of Mechanisms. The Mobility Analysis of Mechanisms (Kutzbach or Grübler mobility criterion) may be used to describe the mobility, or output degree of freedom of a linkage. This system may be used to describe the mobility m of a planar linkage composed of n links that are coupled with p flexible joints/pivots. In the various embodiments, discussed herein, the links can be connected via these flexible joints/pivots allowing some degree of freedom between one another. Additionally, the relationship of the links via the joints define various characteristics such as instantaneous velocity centers (IVCs). In various examples as applied to the various embodiments discussed herein, the flexible joints/pivots can include revolute, slider, cam joints, or any other suitable flexible joints or pivots that allow one degree of freedom movement between the two links they connect. Notably, flexible joints may include intermediary devices connecting the linkages. Depending on the types of joints, quality of joints, or the tolerances in the joints, characteristics (e.g. the IVCs or other characteristics discussed herein) may have small variances between joints due to real world engineering constraints and calculations. Terminology such as generally, substantially, or other similar terms may be used to account for the expected, calculated, or otherwise real-world accuracy of the characteristics discussed herein while allowing for real world variance in the characteristics. Note that if bodies are coupled as one and not considered completely rigid, a specific joint (e.g. a revolute joint) may be assumed theoretically for analysis near the point of flexure in the flexible joint. Also, note that although the linkage is considered planar kinematically, the assembly of the mechanism may be 3-dimensional.

The following equation is used for analysis of the various systems herein:

$$\text{mobility} = m = 3(n-1-p) + p$$

n = number of bodies (or links or members)
p = number of joints
Σf = sum of the kinetic variables in the mechanism As an example, this equation may be applied to a 4-bar linkage. The following solves the equation for a 4-bar linkage:

$$p = n = 4$$

$$m = 3(n-1-p) + p$$

$$m = 3(4-1-4) + 4$$

$$m = 3(-1) + 4$$

$$m = -3 + 4$$

$$m = 1$$

As another example, this equation may be applied to a 6-bar linkage. The following solves the equation for a 6-bar linkage:

$$n = 6$$

$$p = 7$$

$$m = 3(n-1-p) + p$$

$$m = 3(6-1-7) + 7$$

$$m = 3(-2) + 7$$

$$m = -6 + 7$$

$$m = 1$$

In both noted 4-bar and 6-bar linkages, m=1, or there is one degree of freedom of motion. Therefore, the path of the axis of the driven wheel, known as the driven wheel axis path (DWAP) may be constrained to planar motion along a defined path or curve relative to the suspended body. This path or curve includes one end-point defined as the extended state, and another end-point as the compressed state. Any point on this curve or path between the extended and compressed points is known as an intermediate state. An intermediate state on an IVC migration curve or path correlates to an intermediate state of the linkage positions. An intermediate state may be an at least partially compressed state or an at least partially extended state.

Additionally, methods of analyzing vehicle suspension linkages design for its dynamic response have been disclosed in patent applications US20190039682A1, U.S. Ser. Nos. 62/815,675, 62/833,496, and 62/867,169, which are incorporated above and are used in this application. In one example, this method of analysis includes a collection of the system instantaneous velocity centers (IVCs), which can be determined graphically. An IVC is a point common to two linkage bodies where there is zero relative velocity. These IVCs change location instantaneously as the suspension is cycled from its extended to compressed state. The path of each IVC migration may then be plotted graphically as a path, curve, or spline from the extended to the compressed state. These IVC curves depend upon the reference frame considered. In various embodiments, the suspended body is considered fixed as the driven wheel moves from the extended to the compressed state. Total suspension travel (VWT[T]) is then defined as the perpendicular distance relative to the ground line at the extended state as measured between the extended suspension state point and the compressed suspension state point on the driven wheel axis path.

It is possible for an IVC, known as a stationary IVC (SIVC), to have little to no migration from the extended to the compressed state. One example would be an IVC where a link body is operatively connected to the suspended body. This is a result of the front-triangle remaining fixed in the reference frame chosen for suspension analysis.

For reference herein, specific instantaneous velocity centers of a linkage are denoted as IVC[Body-A][Body-B]. Body-A and Body-B being the relevant bodies in the relationship. For example, IVC[1][2] is the instantaneous velocity center relative to a body-1 and a body-2. Additionally, the relationship is reciprocal, therefore IVC[1][2] is equivalent to IVC[2][1].

The structure surrounding the suspension system may include several bodies. In various examples, the structure may include a suspended body. In various embodiments, the suspended body can be suitable to be supported by a suspension and support a user over the suspension. In various examples, the structure may include a "wheel carrier" body, which is operatively coupled to the driven wheel, a "brake carrier" body, which is operatively coupled to the driven wheel brake, or a "dynamic body" (DB), which is any combination of a wheel carrier and a brake carrier body (e.g., DB=wheel carrier body, or DB=brake carrier body, or DB=wheel and brake carrier body).

Specific IVC migrations called dynamic IVCs (DIVCs) may be utilized to determine the vehicle's dynamic response. The DIVCs depend upon the specific linkage layout but also depend upon suspended body-1 since this is the body in which a passenger or rider will be included. Suspended body-1 is often called the front triangle of a bicycle.

As used herein DIVC[AD] can define both the acceleration and deceleration response of the vehicle.

As used herein DIVC[A] can define the acceleration response of the vehicle.

As used herein DIVC[D] can define the deceleration response of the vehicle.

As used herein DIVC[C] is defined as a DIVC that includes the acceleration component. DIVC[C] can be equal to DIVC[A] or DIVC[AD].

As used herein DIVC[E] is defined as a DIVC that includes the deceleration component. DIVC[E] can be equal to DIVC[D] or DIVC[AD].

The linkage body the rear brake is mounted to may define a deceleration response of the suspension linkage. In some embodiments, a brake and a wheel are mounted to the same body. In such embodiments both the acceleration response and the deceleration response may be associated with the same IVC, such as a DIVC[AD]. In some embodiments, a brake and a wheel may be mounted to separate bodies and the acceleration and deceleration responses may be associated with separate IVCs such as a DIVC[A] and a DIVC[D].

As used herein DIVC is a general term and therefore a DIVC may be a DIVC[AD] or a DIVC[A] or a DIVC[D] or a DIVC[C] or a DIVC[E]. As used herein DIVC[L] is the length of the DIVC migration path, spline or curve.

In accordance with various embodiments, the body-X can be both a wheel carrier and a brake carrier body. In such an embodiment, there is a single DIVC[AD] migration, DIVC[AD][1][X].

In accordance with various embodiments, wheel carrier body-Y can be separate from the brake carrier body-Z. In such an embodiment, there are two DIVCs, DIVC[A][1][Y] and DIVC[D][1][Z].

Finally, in accordance with various embodiments, the wheel carrier body-Y is pivotally concentric to a brake carrier body-Z. In this case, again there are two DIVCs, DIVC[A][1][Y] and DIVC[D][1][Z]].

Each of these various embodiments can be variously applied to the embodiments and examples of the various systems discussed in more detail below.

For purposes of understanding, but not to be limiting, it can be noted that the point in which the force of gravity acts on the sum of the suspended vehicle mass (also known as the sprung mass) and any additional mass such as a passenger or cargo that is supported by the suspension is known as the center of gravity (COG). In the static case, with both wheels on the ground, the force due to the suspended mass through the COG is supported by the vehicles two wheels. Depending on the COG location and the wheelbase of the vehicle, the distribution of force between the two wheels may vary. When the vehicle accelerates, load transfer occurs and the force distribution between the two wheels changes. The rear wheel load is increased while the front wheel load is decreased. Thus, the rear suspension tends to compress or squat. Driving forces of the vehicle such as a chain or belt may be utilized to counteract the tendency to squat during acceleration. This is known in vehicle dynamics as anti-squat.

Anti-squat is typically described as a percentage value. One hundred percent anti-squat is when the anti-squat force opposing the squatting motion of the suspension is equal and opposite to the load transfer force due to acceleration. As a result, the system is in equilibrium and no suspension squat occurs. Over 100% anti-squat is when the anti-squat force is both opposite and greater than the load transfer force and therefore the suspension extends during acceleration. Anti-squat of 0% is when there is zero anti-squat force to counteract the load transfer and therefore suspension squats during acceleration. Anti-squat between 0-100% is when the anti-squat force is both opposite and less than the load transfer force and therefore the suspension squats during acceleration but to a lesser degree than with 0% anti-squat. A negative anti-squat percentage is when the anti-squat force acts in the same direction on the rear wheel as the load transfer force and therefore the squat due to load transfer is magnified. Anti-squat is directly related to the DIVC[C] migration of the suspension linkage. Anti-squat around or slightly above 100% is ideal where pedaling occurs typically around the first half of travel to improve pedaling efficiency. After this point, an anti-squat below 100% is ideal so that the driving force is minimized, and the suspension can be utilized later in the travel where pedaling typically does not occur. This also minimizes feedback from the driving force to the rider. Too high of an anti-squat is less than ideal because it results in high feedback from the driving force to the rider and is detrimental to pedaling efficiency because the load transfer and anti-squat forces are far from equilibrium.

When the vehicle decelerates, the force distribution changes, and the front wheel load is increased while the rear wheel load is decreased. As a result, the rear suspension tends to extend or rise. This is known in vehicle dynamics as anti-rise. The magnitude of anti-rise is directly related to the DIVC[E] migration.

One hundred percent anti-rise is when the anti-rise force is equal and opposite to the load transfer force due to deceleration. As a result, the system is in equilibrium and no suspension rise occurs. Over 100% anti-rise is when the anti-rise force is both opposite and greater than the load transfer force and therefore the suspension squats during deceleration. Anti-rise of 0% is when there is zero anti-rise force to counteract the load transfer and therefore the suspension rises during deceleration. Anti-rise between 0-100% is when the anti-rise force is both opposite and less than the load transfer force and therefore the suspension rises during deceleration but to a lesser degree than with 0% anti-rise. A negative anti-rise percentage is when the anti-rise force acts in the same direction on the rear wheel as the load transfer force and therefore the rise due to load transfer is magnified. Anti-rise less than 100% may help improve traction while anti-rise greater than 0% may help stabilize geometry during deceleration. Therefore, an anti-rise in the 50-100% can be a suitable range for an improved ride.

Tony Foale (Foale, Tony. *Motorcycle Handling and Chassis Design the Art and Science. Second Edition*. Spain: Tony Foale Designs by Tony Foale, 2002. PDF accessed 2011.) incorporated herein by reference in its entirety, details a simple graphical method to determine anti-squat and anti-rise percentages by using a side view of a belt or chain-driven two-wheel vehicle.

Based upon the number of bodies present in the structure, the total number of instantaneous velocity centers (IVCs) can be determined. The following equation can be used:

$$\text{Number of Instance Centers} = N = \frac{n(n-1)}{2}$$

n=number of bodies moving relative to one another
N=total number of instantaneous velocity centers of the linkage As an example, this equation may be applied to a 4-bar linkage. In this example, n=4. The following solves the equation for a 4-bar linkage:

$$N_4 = \frac{4(4-1)}{2} = \frac{12}{2} = 6$$

This example shows that there are 6 total instantaneous velocity centers for a 4-bar linkage.

As another example, this equation may be applied to a 6-bar linkage. In this example, n=6. The following solves the equation for a 6-bar linkage:

$$N_6 = \frac{6(6-1)}{2} = \frac{30}{2} = 15$$

This example shows that there are 15 total instantaneous velocity centers for a 6-bar linkage.

In accordance with various embodiments, the suspension system can include a suspension setup having more than four links. It may be noted that while some of the concepts discussed herein might be accomplished with four links. In some of the embodiments discuss herein, as shown herein by example, six links are used. As is suitable, more or few links can also be used to accomplish the various concepts as discussed herein.

As noted above, there are 15 IVCs in a 6-bar linkage.

$$N_6 = \frac{6(6-1)}{2} = \frac{30}{2} = 15$$

A selection of the 15 total IVCs can be determined visually without being derived using other IVCs as further described below. As used herein, these IVCs are known as physical IVCs, or PIVCs. PIVCs are defined at the pivotal axes (or virtual pivotal axes if a flex joint) of jointed linkage body members. An IVC that is not a PIVC occurs when a link body does not have a direct connection with another link body. There are typically four PIVCs in a 4-bar linkage while there are typically seven PIVCs in a 6-bar linkage. In some cases, there are additional PIVCs when an IVC is coincident to a PIVC throughout the linkage's range of motion. Also note, that while a PIVC is defined as a special type of IVC, IVC is used as a general term. In other words, all PIVCs are IVCs, but an IVC may or may not be a PIVC. As an example, and with further explanation detailed below, solid lines shown in FIG. 2 represent the seven PIVCs of the fifteen IVCs of 6-bar linkage shown in FIG. 1A. The dotted lines represent the remaining 8 IVCs that must be derived.

As used herein generally a suspended body is the frame portion of the vehicle that is configured to directly support the weight of a rider on a suspension system. The suspended body may also be referred to as the front triangle herein, however, this is not meant to be limiting of the shape of the suspended body but merely referential of the portion of the vehicle that is suspended or supports the weight of the rider.

In one embodiment shown in FIG. 1A, a two-wheel vehicle suspension linkage system is shown in the extended state. The suspension includes suspended body-1, seat stay body-2, link body-3, chain stay body-4, link body-5, and link body-6 operatively coupled with one another. This arrangement defines seven "physical" IVCs known as PIVCs which are further explained in the specification. Four of the 7 PIVCs are shown in FIG. 1A: PIVC[2][4] 11, PIVC[1][5] 12, PIVC[2][5] 13 and PIVC[5][6] 14. The remaining three PIVCs: PIVC[1][3] 7, PIVC[3][4] 8 and PIVC[3][6] 9 are not shown in FIG. 1A, but in later FIGS. 1B and 1C derived from detail view A for clarity. Link body-3 includes jointed connections with suspended body-1 defining PIVC[1][3] 7, chain stay body-4 defining PIVC[3][4] 8 and link body-6 defining PIVC[3][6] 9. Not shown in FIG. 1A for clarity, but in later figures derived from detail view A, is one of eight virtual IVCs in this embodiment, IVC [4][6] 10. Chain stay body-4 includes an additional jointed connection with seat stay body-2 defining PIVC[2][4] 11. Link body-5 includes jointed connections with suspended body-1 defining PIVC[1][5] 12, seat stay body-2 defining PIVC[2][5] 13, and link body-6 defining PIVC[5][6] 14. Longitudinal direction 80 and lateral direction 81 are defined.

In FIG. 1A suspended body-1 is suspended by the suspension system at least at the rear of the bike and preferably by a suspension fork at the front, which is not shown herein for simplicity of the figures. Front wheel 20 is pivotally connected to a fork at front wheel axis 21 of the front fork which is operatively connected to suspended body-1. Typically, a crank or drivetrain or driving cog is mounted about driving cog axis 23. Seat-stay body-2 is a dynamic body (DB), comprising a wheel carrier and a brake carrier. A brake caliper may be connected to mounts 22 of seat stay body-2 in this embodiment. Note that in other embodiments seat stay body-2 maybe be a wheel carrier only, a brake carrier only, or it can be a non-dynamic body. The seat-stay body-2 can include a driven wheel axis 19. In accordance with the embodiment, the seat-stay body-2 is operatively coupled to a driven wheel 18 about driven wheel axis 19. The driven wheel 18 may engage with the ground 24. The suspension includes a spring/damper unit configured to resist movement between pivot 16 of suspended body-1 and pivot 17 of link body-5. The spring/damper unit may include an extension body or bodies to increase its effective length.

Figure 1B:
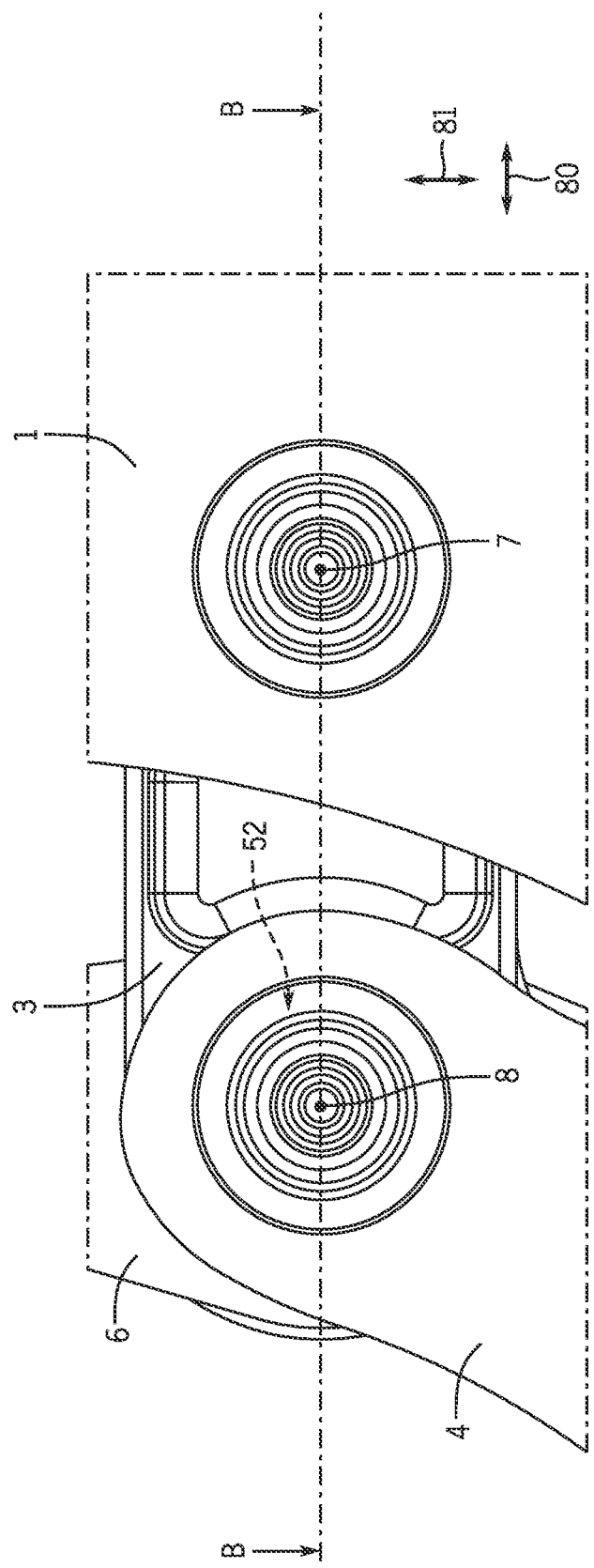
FIG. 1B shows detail view A of embodiment 1 with noted cross section line B-B.
Figure 2:
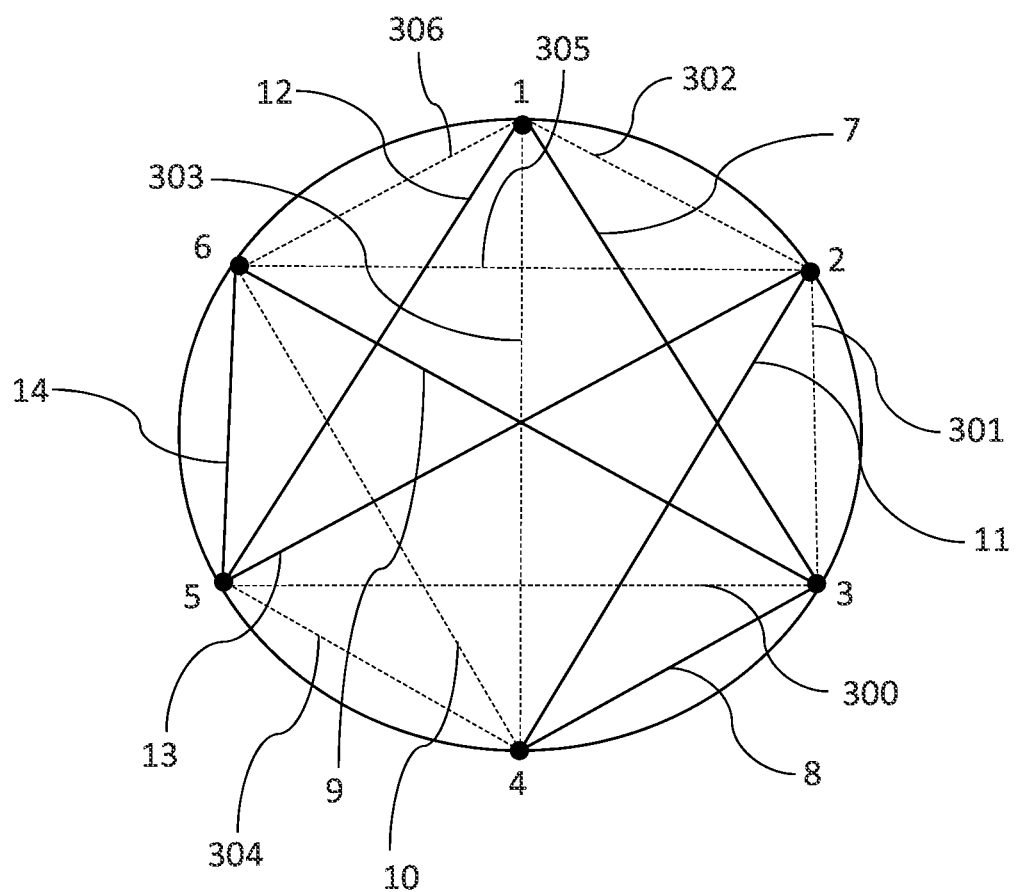
FIG. 2 is an analytical schematic representing the relationships between the various bodies and IVCs of the suspension system of FIG. 1A.

FIG. 1B shows detail view A of embodiment 1 with noted cross section line B-B. Here, suspended body-1, link body-3, chain stay body-4, link body-6, PIVC[1][3] 7, and PIVC [3][4] 8 are shown as well as cross section line B-B for embodiment 1.

Figure 1C:
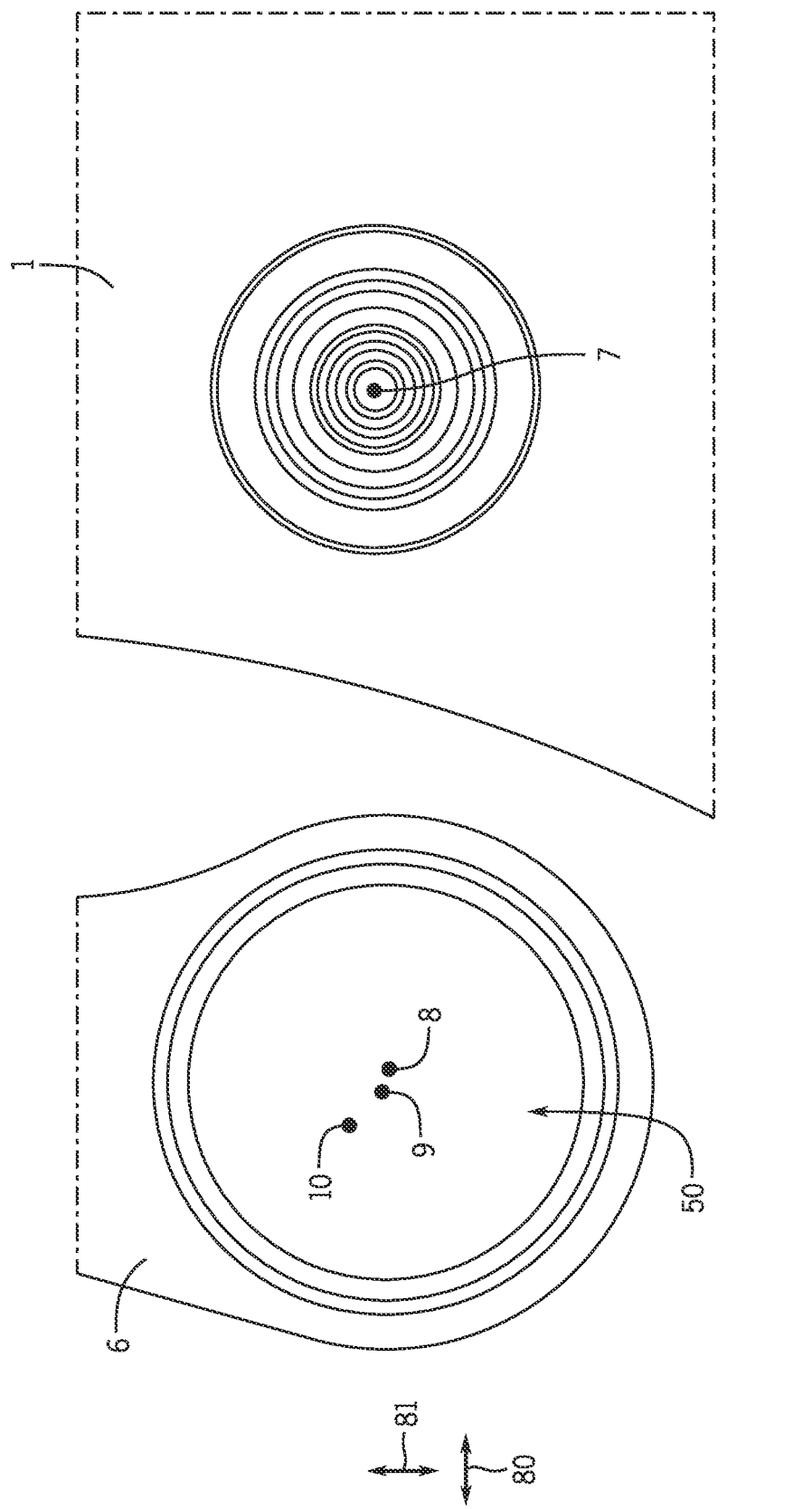
FIG. 1C shows detail view A of embodiment 1 with several bodies removed for clarity.

FIG. 1C shows detail view A of embodiment 1 with link body-3, chain stay body-4 and several other bodies removed for clarity. The wall of the link body-6, the link body-3 and/or the suspended body-1 may define respective apertures. For example, the link body-6 may define an aperture 50. Likewise, the link body-3 may define an aperture 52. Either or both of the apertures may extend through the respective body in which they are formed. Either or both of the apertures may be separate opposing recesses having a common axis. Either or both of the apertures may include an axis of an IVC. For example, the aperture 50 may include an axis of any combination of the IVC[3][4], the IVC[3][6], and/or the IVC[4][6]. FIG. 1C shows the suspended body-1, link body-6, with link body-6 aperture 50. PIVC[1][3] 7, PIVC [3][4] 8, PIVC[3][6] 9 and IVC [4][6] 10 are also shown. Note that PIVC [3][4] 8, PIVC[3][6] 9 and IVC [4][6] 10 are not coincident, and are located within aperture 50 and/or aperture 52.

FIGS. 2-8 are analytical schematics used to derive the "virtual" or hidden IVC [4][6] 10.

FIG. 2 is a complete analytical schematic representing the relationships between the various bodies and IVCs of the suspension system of FIG. 1A. Referencing FIG. 2, the suspended body-1, seat stay body-2, link body-3, chain stay body-4, link body-5 and link body-6 are represented by points along the circumference of the analytical schematic. Lines represent the 15 IVCs linking each part of the suspension system. Solid lines show the seven PIVCs, PIVC [1][3] 7, PIVC[3][4] 8, PIVC[3][6] 9; PIVC[2][4] 11, PIVC [1][5] 12, PIVC[2][5] 13, and PIVC[5][6] 14, depicted in FIG. 2, while the dashed lines represent the eight IVCs, IVC[4][6] 10, IVC[3][5] 300, IVC[2][3] 301, DIVC[AD] [1][2] 302, IVC[1][4] 303, IVC[4][5] 304, IVC[2][6] 305, and IVC[1][6] 306.

IVC [4][6] is not a PIVC so it is not visually established and must be derived using known PIVCs as well as with other IVCs that have been solved for. Every linkage system is different and the order of this process may change, and or be solved in alternative orders.

Figure 3:
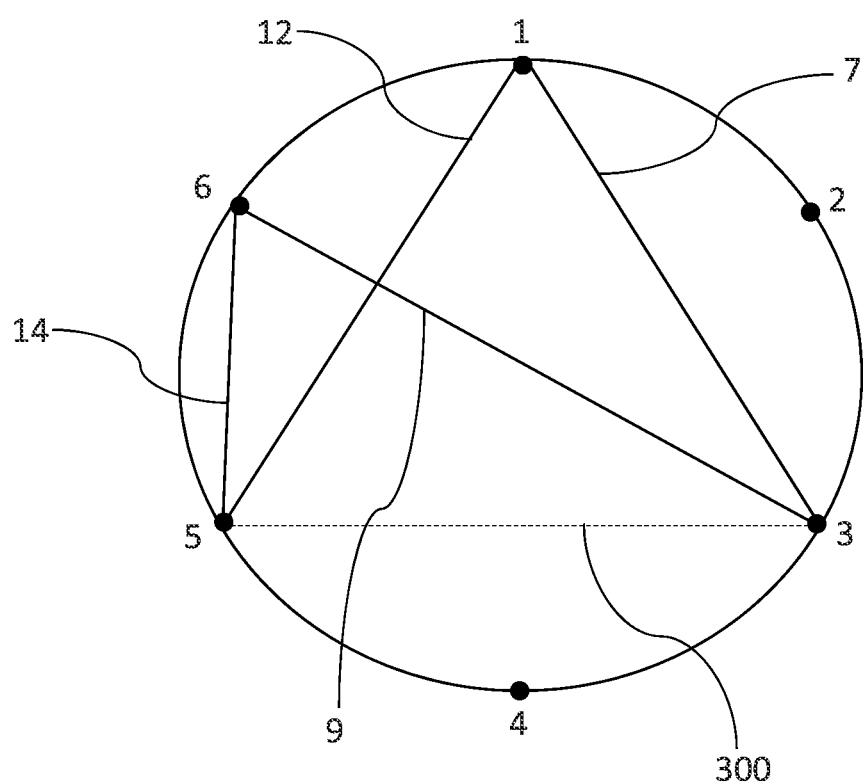
FIG. 3 is an analytical schematic showing a step of solving for a selected, unknown or "virtual" IVC, using selected PIVCs in FIG. 2.

FIG. 3 is an analytical schematic showing a first step of solving for unknown or "virtual" IVC[4][6] 10. First, unknown IVC[3][5] 300 is derived by using a first PIVC pair PIVC[1][3] 7 and PIVC[1][5] 12 that is triangulated with IVC[3][5] 300, along with a second PIVC pair PIVC [3][6]

9 and PIVC [5][6] 14 that is triangulated with IVC[3][5] 300. Drawn graphically on FIG. 3, the intersection of lines drawn through the first PIVC pair and the second PIVC pair define IVC[3][5] 300. This is not shown in figures, but the process is well documented in the patent applications noted above.

Figure 4:
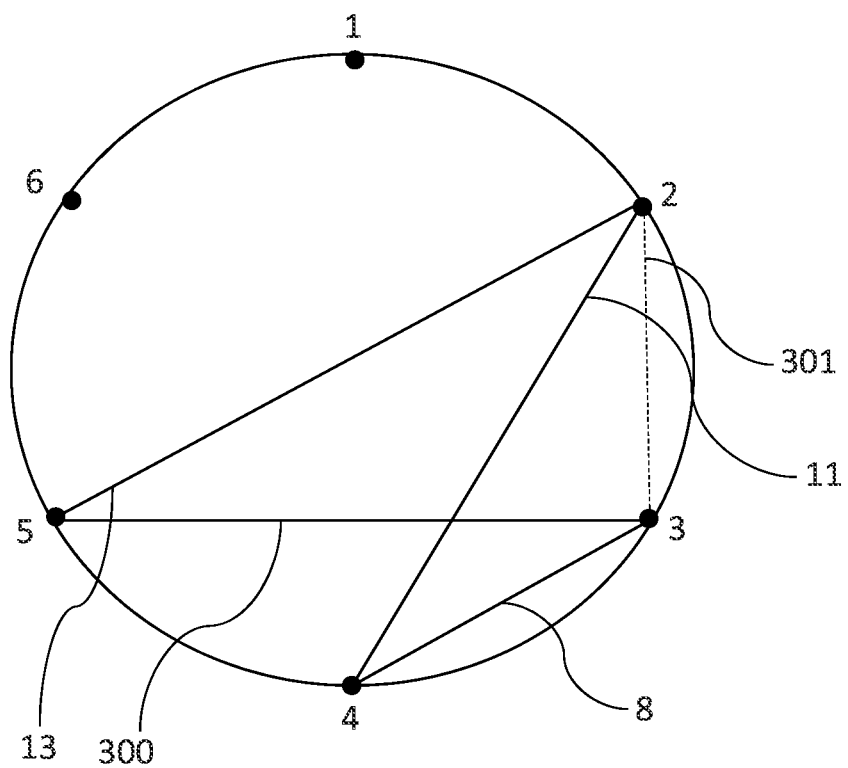
FIG. 4 is an analytical schematic showing a step of solving for a selected, unknown or "virtual" IVC, using a combination of the IVC solved for in FIG. 3 and selected PIVCs in FIG. 2.

FIG. 4 is an analytical schematic showing a second step of solving for unknown or "virtual" IVC[4][6] 10. Next, unknown IVC[2][3] 301 is derived by using a first PIVC pair PIVC[3][4] 8 and PIVC[2][4] 11 that is triangulated with IVC[2][3] 301, along with a second IVC pair PIVC [2][5] 13 and previously solved for IVC [3][5] 300 that is triangulated with IVC[2][3] 301. Drawn graphically on FIG. 4, the intersection of lines drawn through the first PIVC pair and the second PIVC pair define IVC[2][3] 301. This is not shown in figures, but the process is well documented in the patent applications noted above.

Figure 5:
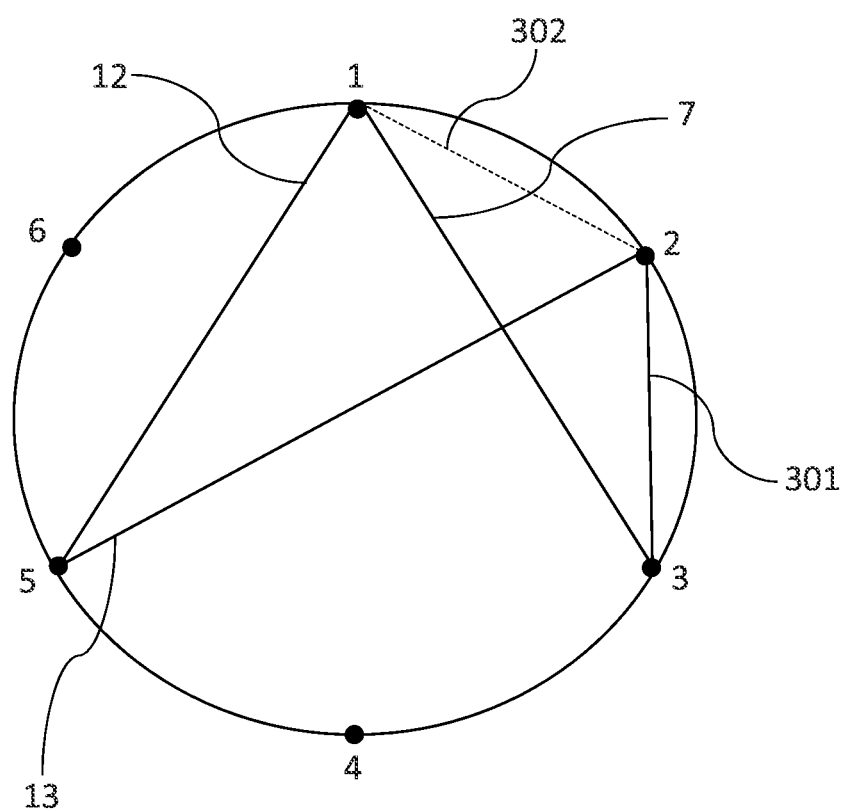
FIG. 5 is an analytical schematic showing a step of solving for a selected, unknown or "virtual" IVC, using a combination of the IVC solved for in FIG. 4 and selected PIVCs in FIG. 2.

FIG. 5 is an analytical schematic showing a third step of solving for unknown or "virtual" IVC[4][6] 10. Next, unknown DIVC[AD][1][2] 302 is derived by using a first PIVC pair PIVC[1][5] 12 and PIVC[2][5] 13 that is triangulated with DIVC[AD][1][2] 302, along with a second IVC pair PIVC [1][3] 7 and previously solved for IVC [2][3] 301 that is triangulated with DIVC[AD][1][2] 302. Drawn graphically on FIG. 5, the intersection of lines drawn through the first PIVC pair and the second PIVC pair define DIVC[AD][1][2] 302. This is not shown in figures, but the process is well documented in the patent applications noted above.

Figure 6:
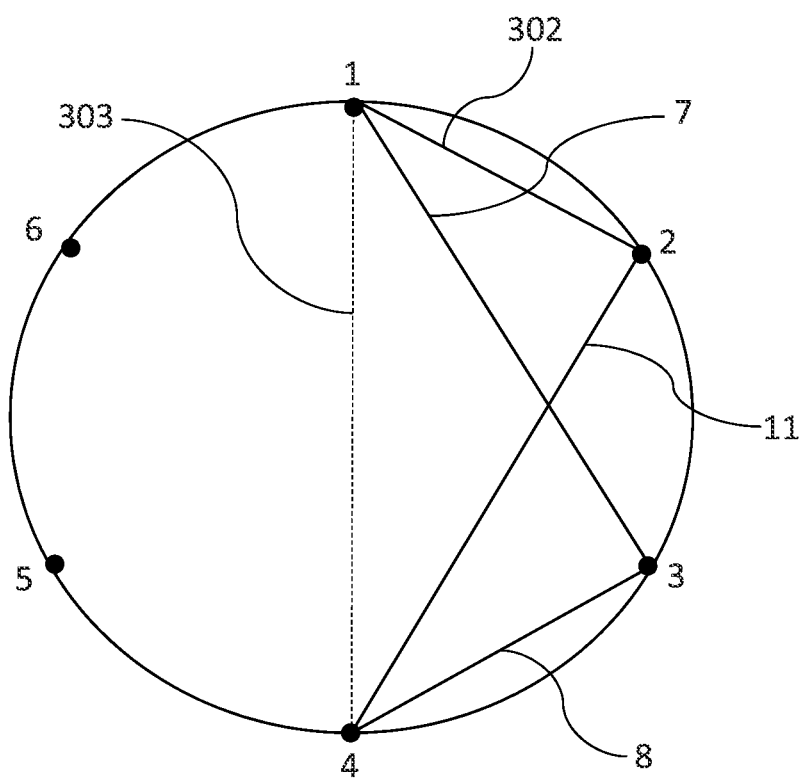
FIG. 6 is an analytical schematic showing a step of solving for a selected, unknown or "virtual" IVC, using a combination of the IVC solved for in FIG. 5 and selected PIVCs in FIG. 2.

FIG. 6 is an analytical schematic showing a fourth step of solving for unknown or "virtual" IVC[4][6] 10. Next, unknown IVC[1][4] 303 is derived by using a first PIVC pair PIVC[1][3] 7 and PIVC[3][4] 8 that is triangulated with IVC[1][4] 303, along with a second IVC pair PIVC [2][4] 11 and previously solved for DIVC[AD][1][2] 302 that is triangulated with IVC[1][4] 303. Drawn graphically on FIG. 6, the intersection of lines drawn through the first PIVC pair and the second PIVC pair define IVC[1][4] 303. This is not shown in figures, but the process is well documented in the patent applications noted above.

Figure 7:
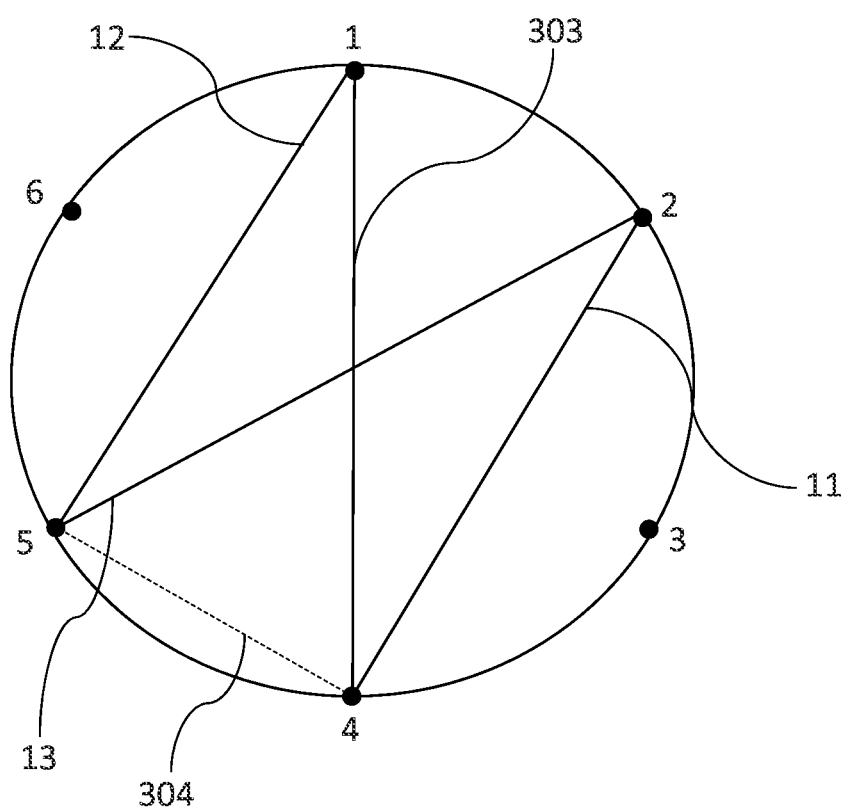
FIG. 7 is an analytical schematic showing a step of solving for a selected, unknown or "virtual" IVC, using a combination of the IVC solved for in FIG. 6 and selected PIVCs in FIG. 2.

FIG. 7 is an analytical schematic showing a fifth step of solving for unknown or "virtual" IVC[4][6] 10. Next, unknown IVC[4][5] 304 is derived by using a first PIVC pair PIVC[2][4] 11 and PIVC[2][5] 13 that is triangulated with IVC[4][5] 304, along with a second IVC pair PIVC [1][5] 12 and previously solved for IVC[1][4] 303 that is triangulated with IVC[4][5] 304. Drawn graphically on FIG. 7, the intersection of lines drawn through the first PIVC pair and the second PIVC pair define IVC[4][5] 304. This is not shown in figures, but the process is well documented in the patent applications noted above.

Figure 8:
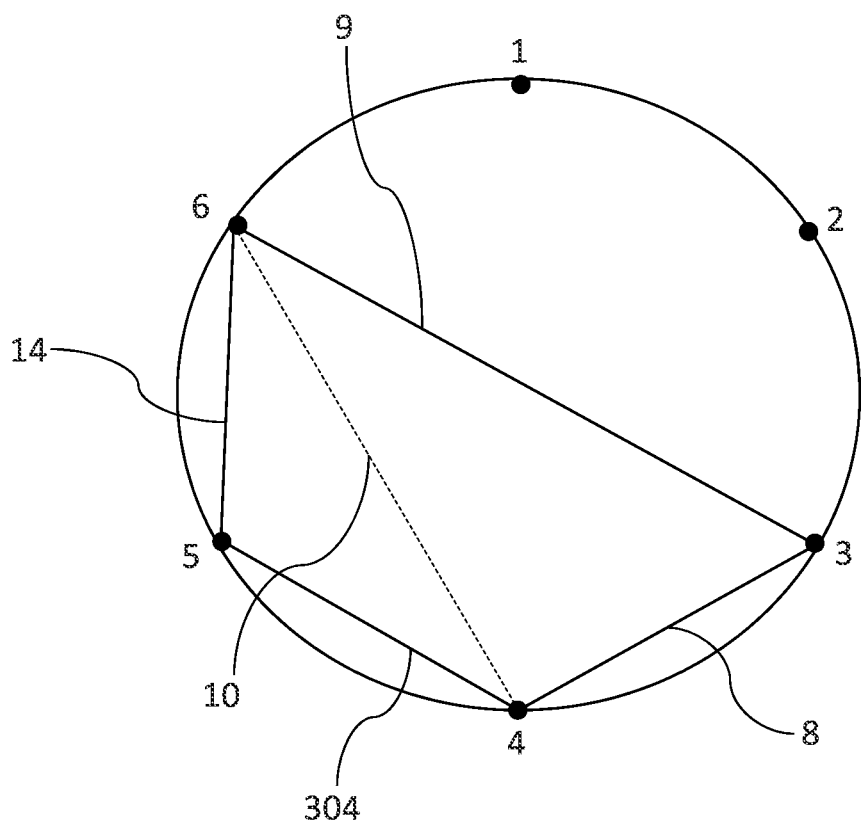
FIG. 8 is an analytical schematic showing a step of solving for a selected, unknown or "virtual" IVC, using a combination of the IVC solved for in FIG. 7 and selected PIVCs in FIG. 2.

FIG. 8 is an analytical schematic showing a final step of solving for unknown or "virtual" IVC[4][6] 10. Next, unknown IVC[4][5] 304 is derived by using a first PIVC pair PIVC[3][4] 8 and PIVC[3][6] 9 that is triangulated with IVC[4][6] 10, along with a second IVC pair PIVC[5][6] 14 and previously solved for IVC[4][5] 304 that is triangulated with IVC[4][6] 10. Drawn graphically on FIG. 8, the intersection of lines drawn through the first PIVC pair and the second PIVC pair define IVC[4][6] 10. This is not shown in figures, but the process is well documented in the patent applications noted above.

Figure 9:
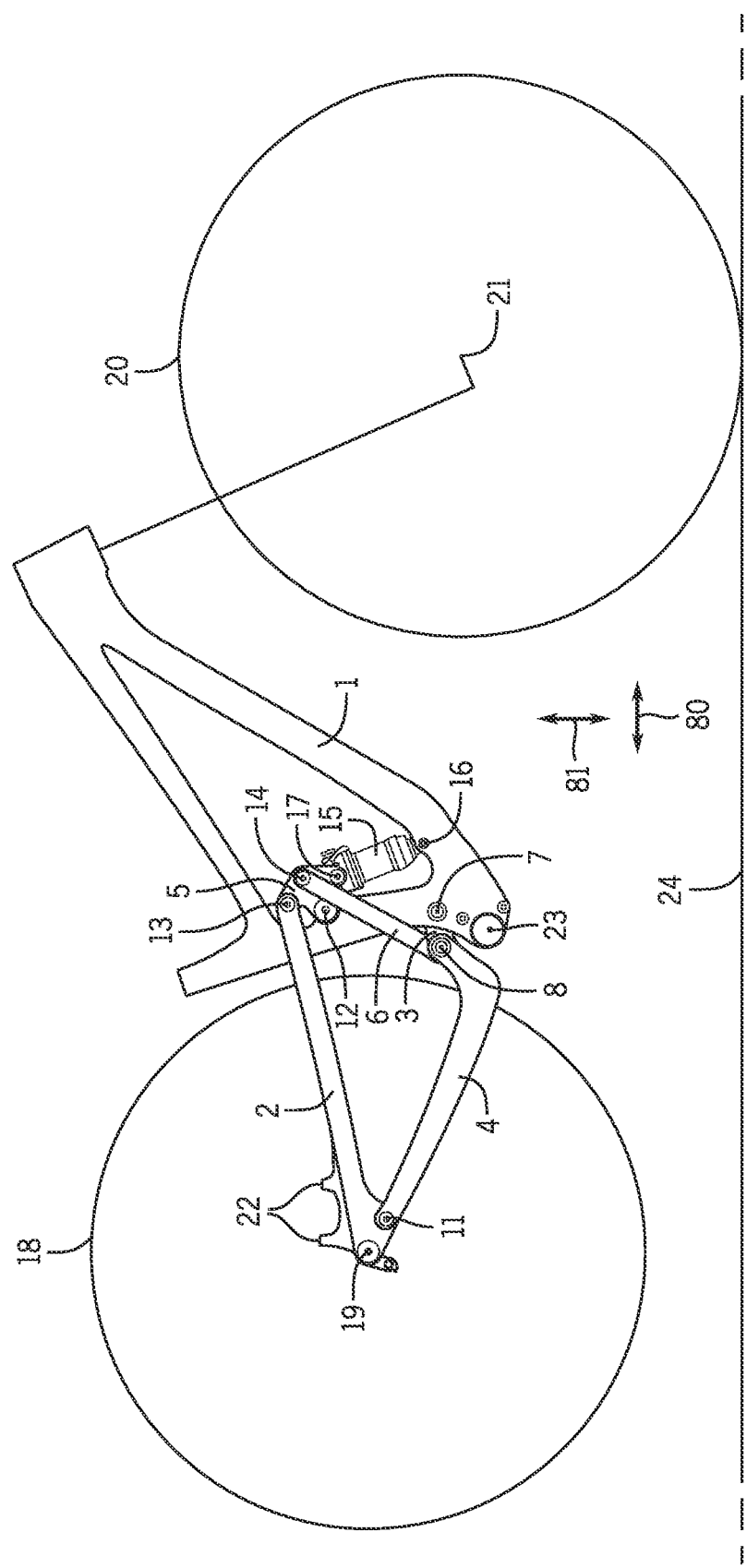
FIG. 9 shows a side view of a 6-bar suspension linkage in the compressed state.

In FIG. 9, the two-wheel vehicle suspension linkage system is shown in the extended state. The suspension includes suspended body-1, seat stay body-2, link body-3, chain stay body-4, link body-5, and link body-6 operatively coupled with one another. Six of the 7 PIVCs are shown in FIG. 1A: PIVC[2][4] 11, PIVC[1][5] 12, PIVC[2][5] 13, PIVC[5][6] 14, PIVC[1][3] 7 and PIVC[3][4] 8. The remaining PIVC, PIVC[3][6] 9 is not shown in FIG. 2, but in later figures derived from detail view A in FIG. 1A for clarity. Link body-3 includes jointed connections with suspended body-1 defining PIVC[1][3] 7, chain stay body-4 defining PIVC[3][4] 8 and link body-6 defining PIVC[3][6] 9. Not shown in FIG. 1A for clarity, but in later figures derived from detail view A, is one of eight virtual IVCs in this embodiment, IVC [4][6] 10. Chain stay body-4 includes an additional jointed connection with seat stay body-2 defining PIVC[2][4] 11. Link body-5 includes jointed connections with suspended body-1 defining PIVC[1][5] 12, seat stay body-2 defining PIVC[2][5] 13, and link body-6 defining PIVC[5][6] 14.

In FIG. 9 suspended body-1 is suspended by the suspension system at least at the rear of the bike and preferably by a suspension fork at the front, which is not shown herein for simplicity of the figures. Front wheel 20 is pivotally connected to a fork at front wheel axis 21 of the front fork which is operatively connected to suspended body-1. Typically, a crank or drivetrain or driving cog is mounted about driving cog axis 23. Seat-stay body-2 is a dynamic body (DB), comprising a wheel carrier and a brake carrier. A brake caliper may be connected to mounts 22 of seat stay body-2 in this embodiment. Note that in other embodiments seat stay body-2 may be a wheel carrier only, a brake carrier only, or it can be a non-dynamic body. The seat-stay body-2 can include a driven wheel axis 19. In accordance with the embodiment, the seat-stay body-2 is operatively coupled to a driven wheel 18 about driven wheel axis 19. The driven wheel 18 may engage with the ground 24. The suspension includes a spring/damper unit configured to resist movement between pivot 16 of suspended body-1 and pivot 17 of link body-5. The spring/damper unit may include an extension body or bodies to increase its effective length.

Figure 10:
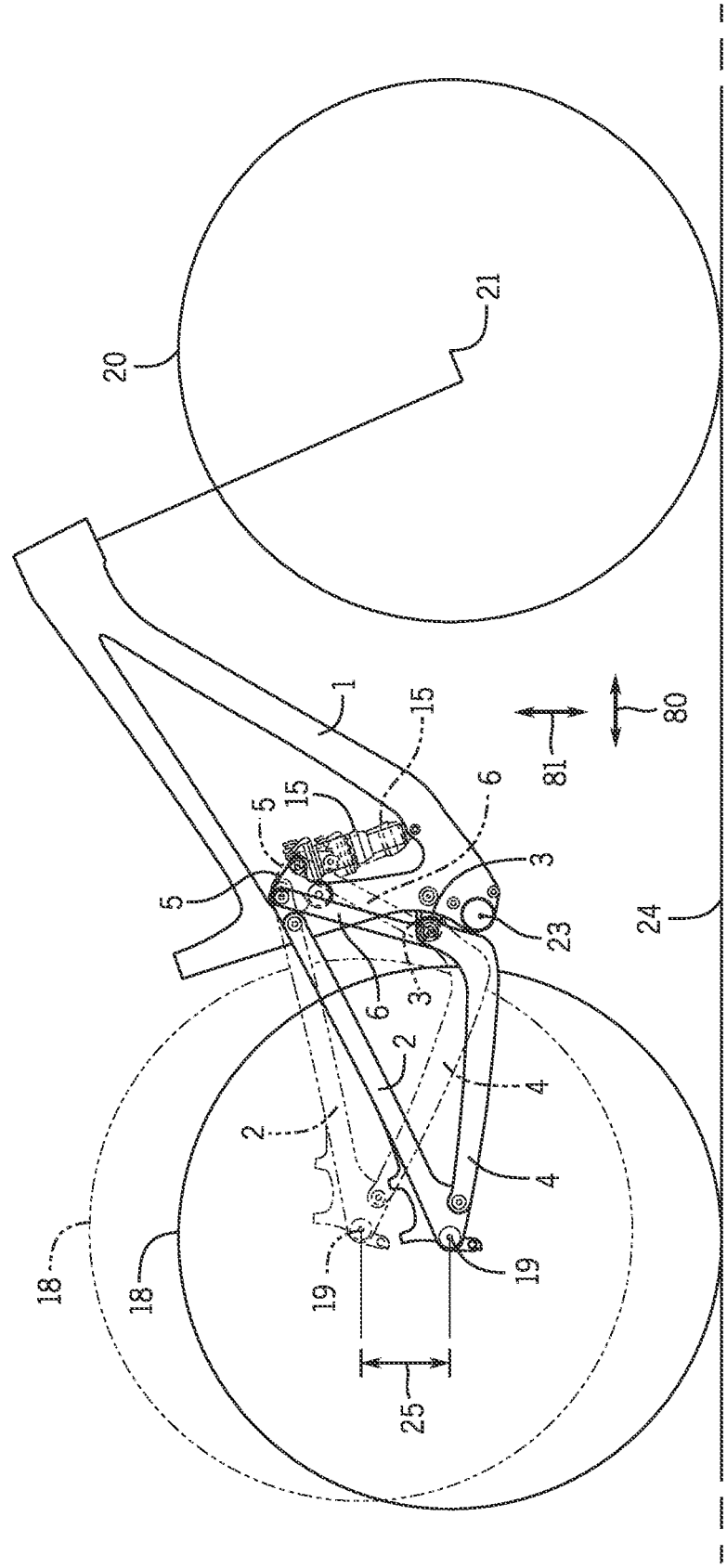
FIG. 10 shows a side view overlay of a 6-bar suspension linkage in the extended and compressed states as well as total suspension travel VWT[T] 25.

FIG. 10 shows a side view overlay of a 6-bar suspension linkage in the extended and compressed states as well as total suspension travel, VWT[T] 25.

Figure 11:
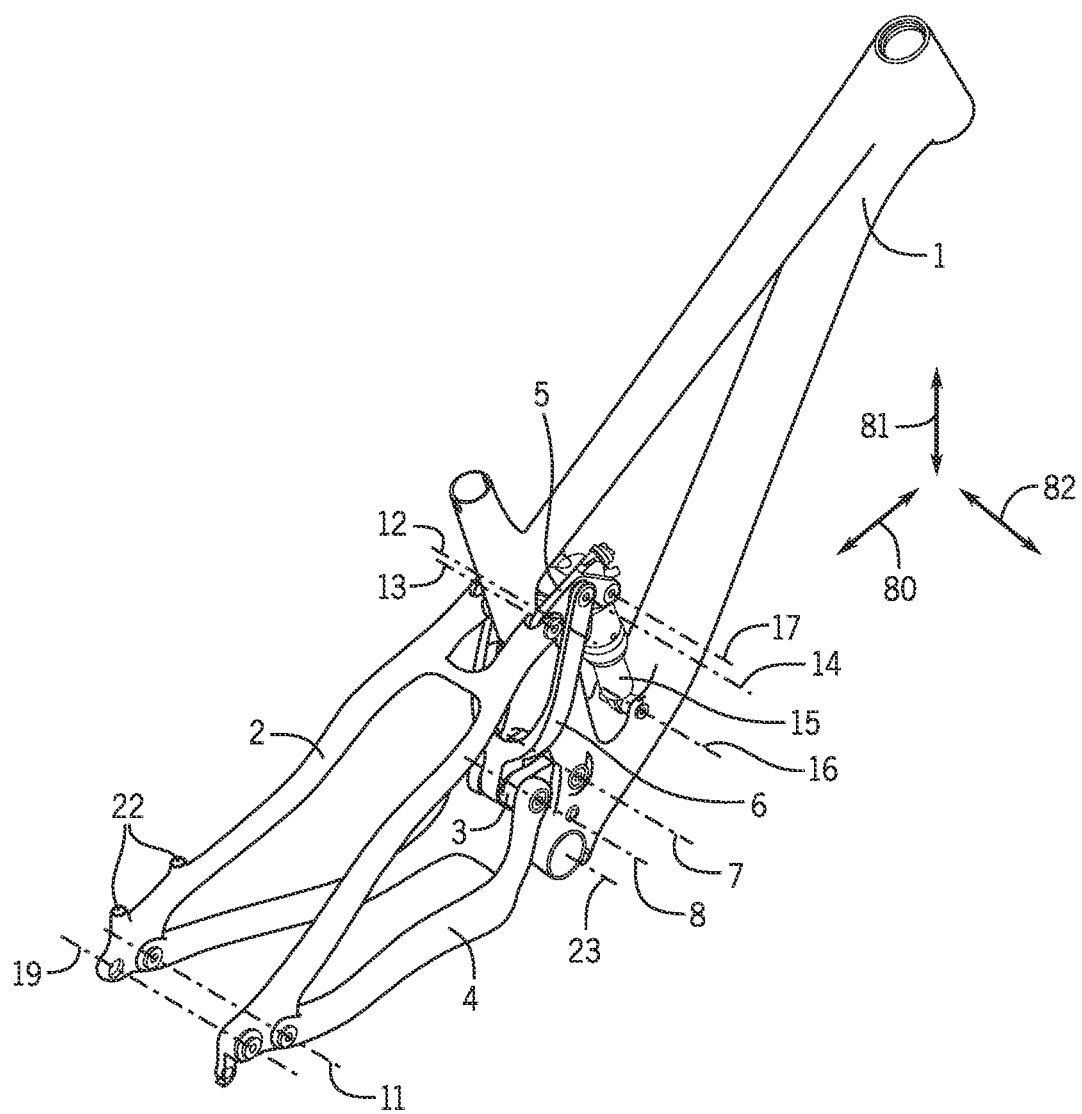
FIG. 11 shows an isometric view of a 6-bar suspension linkage in the extended state.

FIG. 11 shows an isometric view of a 6-bar suspension linkage in the extended state as well as transverse direction 82.

Figure 12:
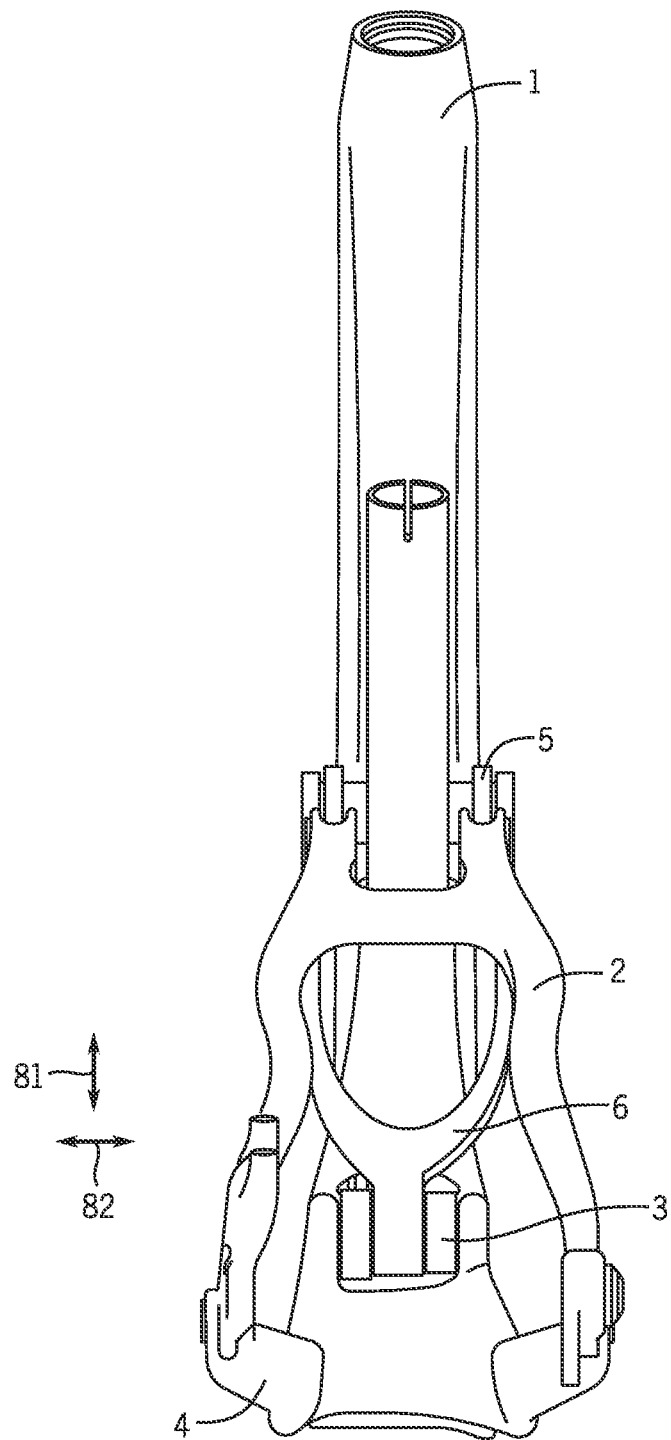
FIG. 12 shows a rear view of a 6-bar suspension linkage in the extended state.

FIG. 12 shows a rear view of a 6-bar suspension linkage in the extended state.

FIGS. 13-21C illustrate two alternative assembly methods based on detail view A of FIG. 1A, and are denoted as embodiment 1 and embodiment 2. These embodiments enable PIVC[3][4] 8, PIVC[3][6] 9 and IVC[4][6] 10 to be located in close proximity within aperture 50 of link body-6 which offer several advantages. First, with IVC[4][6] located in close proximity to PIVC[3][4] 8 and PIVC[3][6] 9, PIVC[1][5] 12 maybe be located lower on suspended body-1 than if IVC[4][6] were located above link body-3 in order to clear the assembly of hardware, bearings, etc. In this case, PIVC[1][5] 12 may be raised to achieve the desired ride performance characteristics of anti-squat, anti-rise, leverage rate, etc. Keeping PIVC[1][5] 12 low on suspended body-1 allows for a lower suspended body frame that is easier for a rider to mount, as well as a lower center of gravity which aids in performance when turning. Second, with PIVC[3][4], PIVC[3][6] and IVC[4][6] located in close proximity, the desired ride performance characteristics of anti-squat, anti-rise, leverage rate, etc. can be achieved, but greater tunability is possible since there are many more potential locations and therefore kinematic solutions for the dynamic behavior of the suspension. Specific examples of suspension characteristic curves can be seen in FIGS. 22-24.

Third, it is possible to minimize the amount of hardware in the assembly thereby reducing weight, complexity, and cost of the assembly. For instance, a single axle/fastener may be used to couple PIVC[3][4] 8 and PIVC[3][6] 9 as opposed to two or more, such as the axle/fastener 111 shown for example in FIG. 13. This is later shown in greater detail. Also, link body-3 can be reduced in size compared to when IVC[3][4] and IVC[3][6] are located further away from one another which results in a larger, triangular shaped link-body. Finally, the packaging envelope of link body-3, link body-4 and link body-6 can be reduced. This may allow for more component clearance such as tires and may allow other structures such as suspended body-1 to be increased in size to increase stiffness and strength ideal for a vehicle.

In accordance with the various embodiments, the linkage body-3 is a support member that extends longitudinally in direction 80 and laterally in direction 81. The linkage body-3 includes multiple IVCs with at least two of the IVCs positioned within a close proximity of one another. In various embodiments, a close proximity is one in which two IVCs fall within the same mechanism envelope that defines their location. For example, the linkage body-3 can have multiple pivot mechanisms. Each of the pivot mechanisms can define mechanism envelopes. In embodiments in which the pivot mechanisms envelopes overlap. For example, the linkage body-3 can include a first mechanical pivot defining a pivot axis 7 (see e.g. FIG. 17 but also consistent with disclosure in FIGS. 13-16) along the transverse direction 82. The linkage body-3 also includes the shaft body 103. The linkage body-3 can also include a third mechanical pivot defining an axis 9 along the transverse direction 82. The pivot mechanism envelope of the pivot mechanism defining axis 9 overlaps the pivot mechanism envelope of the pivot mechanism defining axis 8 in the longitudinal and the lateral directions (see e.g., FIG. 1B). As noted above a pivot mechanism may consist of any flexible joints, pivots, and/or rotational devices that allow some degree of freedom between one another. The flexible joints, pivots, and/or rotational devices can include revolute (e.g. bearing, bushings, or the like suitable mechanisms), slider (rectilinear bearing, curvilinear bearing, or other translational bearing mechanism), cam joints, torsion axles, flexural beam (e.g. leaf spring) or any other suitable flexible joints, pivots, or rotational devices that allow one degree of freedom movement between the two links they connect. Note that axis 7, axis 8 and axis 9 are located at PIVCs as described above. These pivot axes are defined by mechanical pivots as opposed to virtual pivots. In various examples, this particular embodiment may have a similar structure.

Figure 13:
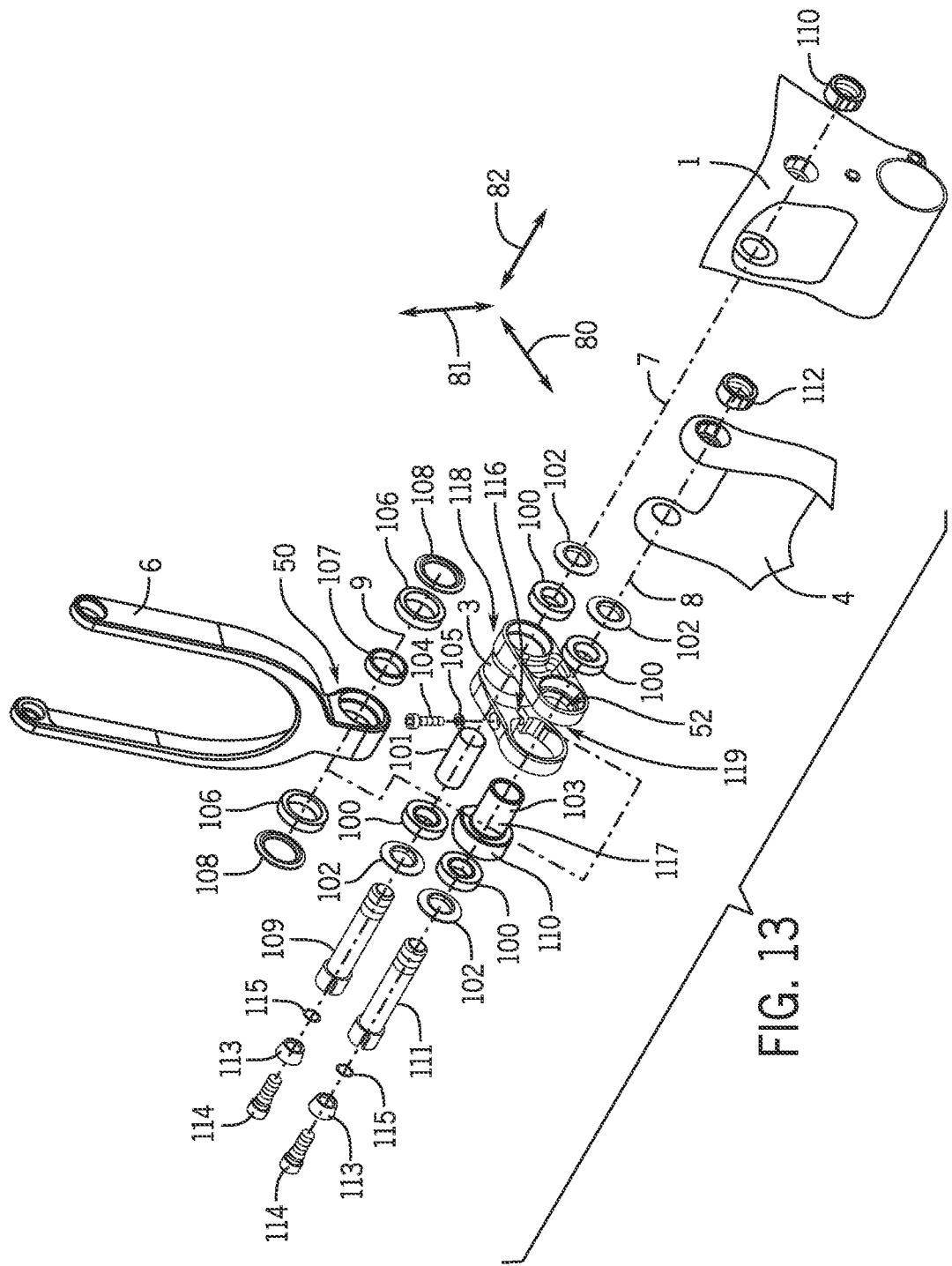
FIG. 13 shows an isometric exploded view of embodiment 1 with several bodies hidden for clarity.

FIG. 13 shows a cropped isometric exploded view of an embodiment of a linkage body 3. Portions of the two-wheeled vehicle are hidden for clarity. In this example, the figure shows the following linkage bodies: Suspended body-1, link body-3, chain stay body-4 and link body-6. The lower pivot interface of linkage body-6 is concentric to the PIVC [3][6] 9 axis and houses a bearing 106 on either side of inner race spacer 107. Note that for clarity, identical similar parts may be labeled with the same number. For instance, there are two pivot mechanisms shown for example as bearings 106 housed in the lower portion of link body-6. These parts could be different in other embodiments. Inner race extender 108 is located on the outside of both bearings 106.

Linkage body-3 is a single piece with a U-like structure. The open end 119 of the U-like structure of linkage body-3 defines an aperture 52A and an aperture 52B in respective legs in the open end 119 of the U shape. The apertures 52A and 52B are concentric with the PIVC [3][4] 8 axis. The IVC[1][2], the IVC[1][3], IVC[2][3] may be located within the aperture 52A and/or 52B. One side of the U has a smaller circular bore interface than the other side of the U and houses a bearing 100 with an inner race extension 102. The other side has a larger circular bore with a keyed flat to accept and clock eccentric shaft body 103 which houses one bearing 100 with an inner race extension 102 is fitted to the outside. The closed end 118 of link body 3 houses bearings 100 on either side of inner race spacer 101. Inner race extension 102 is located on the outside of both bearings 100.

During sub-assembly, the bearing assembly of linkage body-6 described above is fitted in between the open U-like structure of linkage body-3. Then, eccentric shaft body 103 is inserted through the larger circular bore with a keyed flat, and through the PIVC[3][6] 9 axis of link body-6 until one inner race extender 108 bottoms on the inner surface of linkage body-3, and the other bottoms on the inner flange surface of eccentric shaft body 103. Note that the head 110 of eccentric shaft body 103 is concentric to PIVC [3][4] 8, while the shaft 117 is concentric to PIVC [3][6] 9 and that PIVC [3][4] 8 is offset and non-concentric to PIVC [3][6] 9. This will be clear in figures to follow.

Next, chain stay body-4 is assembled to fit outside of the open end of the U-like structure of link body-3 so that it is concentric to PIVC[3][4] 8. Axle fastener 111 then fits through all assembly parts concentric to PIVC[3][4] 8 and threads into keyed threaded nut 112 housed in chain stay body-4. After axle fastener 111 is torqued, pinch bolt 104 is fitted through washer 105 and threaded into link body-3. The link body-3 may include a slotted portion 116 that defines a pair of opposing jaws 151. When torqued, the slotted portion 116 of link body-3 allows deformation (e.g., the jaws 151 are drawn closer to one another to grasp the shaft body 103 of the bearing 100) so that eccentric shaft body 103 is rigid and moves in unity with link body-3. Then, collet wedge bolt 114 is inserted through the inside diameter of tapered collet wedge 113 and then spiral retaining ring 115 is installed onto the collet wedge bolt 114. This allows the collet wedge bolt 114 to rotate relative to tapered collet wedge 113, while being constrained axially. Finally, this sub assembly of collet bolt 114, collet wedge 113 and spiral retaining ring 115 is threaded into axle fastener 111 which has a matching taper with expansion slots. When torqued, the head of axle fastener 111 expands radially into the bore of chain stay body-4 and prevents the link body-3 assembly from moving axially as well as prevents the hardware from loosening.

Finally, the closed end 118 of link body-3 is fitted into the female cavity in suspended body-1, and axle fastener 109 fits through all assembly parts concentric to PIVC [1][3] 7 and threads into keyed threaded nut 112 housed in suspended body-1. Then, collet wedge bolt 114 is inserted through the ID of tapered collet wedge 113 and then spiral retaining ring 115 is installed onto collet wedge bolt 114. This allows collet wedge bolt 114 to rotate relative to tapered collet wedge 113, while being constrained axially. Finally, this sub assembly of collet bolt 114, collet wedge 113 and spiral retaining ring 115 is threaded into axle fastener 109 which has a matching taper with expansion slots. When torqued, the head of axle fastener 109 expands radially into the bore of suspended body-1 and prevents the link body-3 assembly from moving axially as well as prevents the hardware from loosening.

Figure 14:
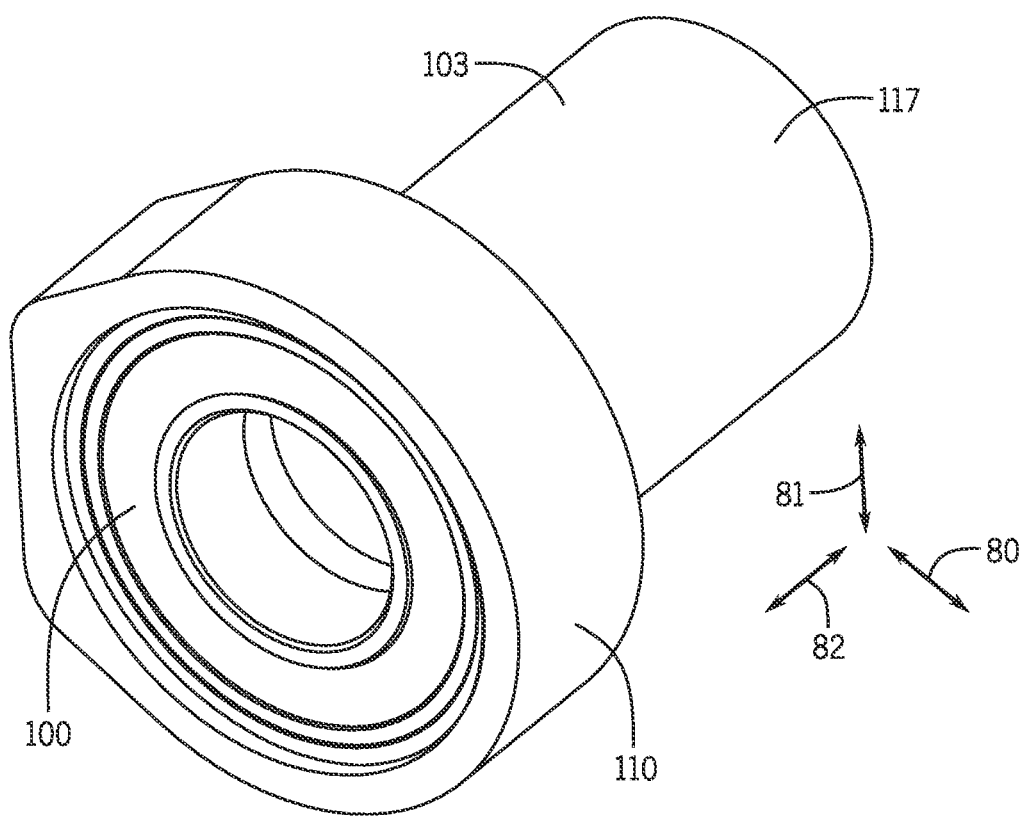
FIG. 14 shows an isometric view of the eccentric shaft body and bearing 100 assembly of embodiment 1.

FIG. 14 shows an isometric view of the eccentric shaft body and bearing-100 assembly of embodiment 1.

FIG. 15A shows a side view of the eccentric shaft body-103 of embodiment 1 and cross section line C-C. Here PIVC[3][4] 8, PIVC [3][6] 9, and IVC [4][6] 10 and their respective offsets are shown. Also, the keyed flat 150 of the head 110 of eccentric shaft body 103 is shown.

Figure 15B:
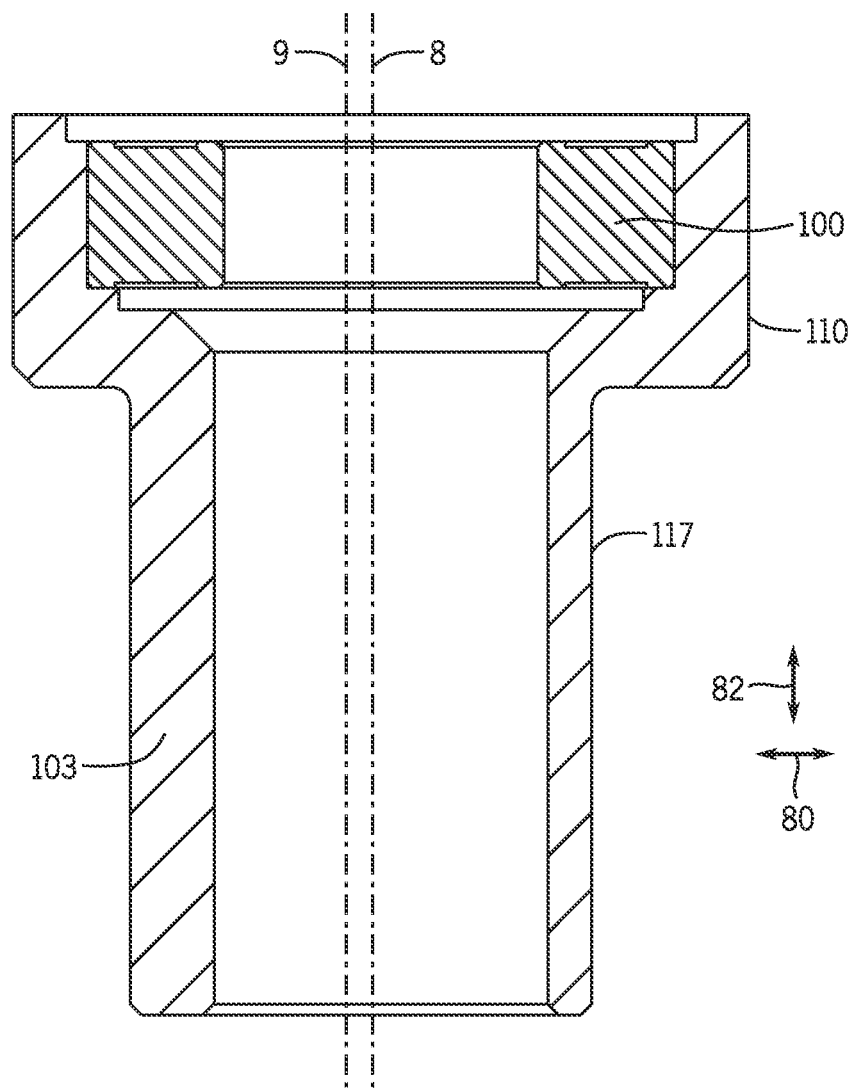
FIG. 15B shows cross section view C of FIG. 15A.

FIG. 15B shows cross section view C of FIG. 15A. This further clarifies the offset of PIVC[3][4] 8 and PIVC[3][6] 9.

FIG. 16 shows a top view of link body-3 of embodiment 1.

FIG. 17 shows an isometric view of embodiment 1 of linkage body-3 with eccentric shaft body 103 and bearing body-100 exploded with several bodies hidden for clarity. Linkage body-3 is a support member that extends longitudinally in direction 80 and laterally in direction 81 with a first mechanical pivot axis 7 along the transverse direction 82 with bearing 100 as a pivot mechanism defining a pivot mechanism envelope. Linkage body-3 also has a second mechanical pivot axis 8 along the transverse direction 82 with bearing 100 as a pivot mechanism defining another pivot mechanism envelope. When linkage body-3 is assembled to eccentric shaft body 103, linkage body-3 has a third mechanical pivot axis 9 along the transverse direction 82. Here, bearing 106 is the pivot mechanism that defines another pivot mechanism envelope which is shown previously in FIG. 13. The pivot mechanism envelope defined by bearing 106 about axis 9 overlaps the pivot bearing mechanism defined by bearing 100 about axis 8 in the longitudinal and the lateral directions in this example which is more clearly seen in FIG. 1B.

Figure 18A:
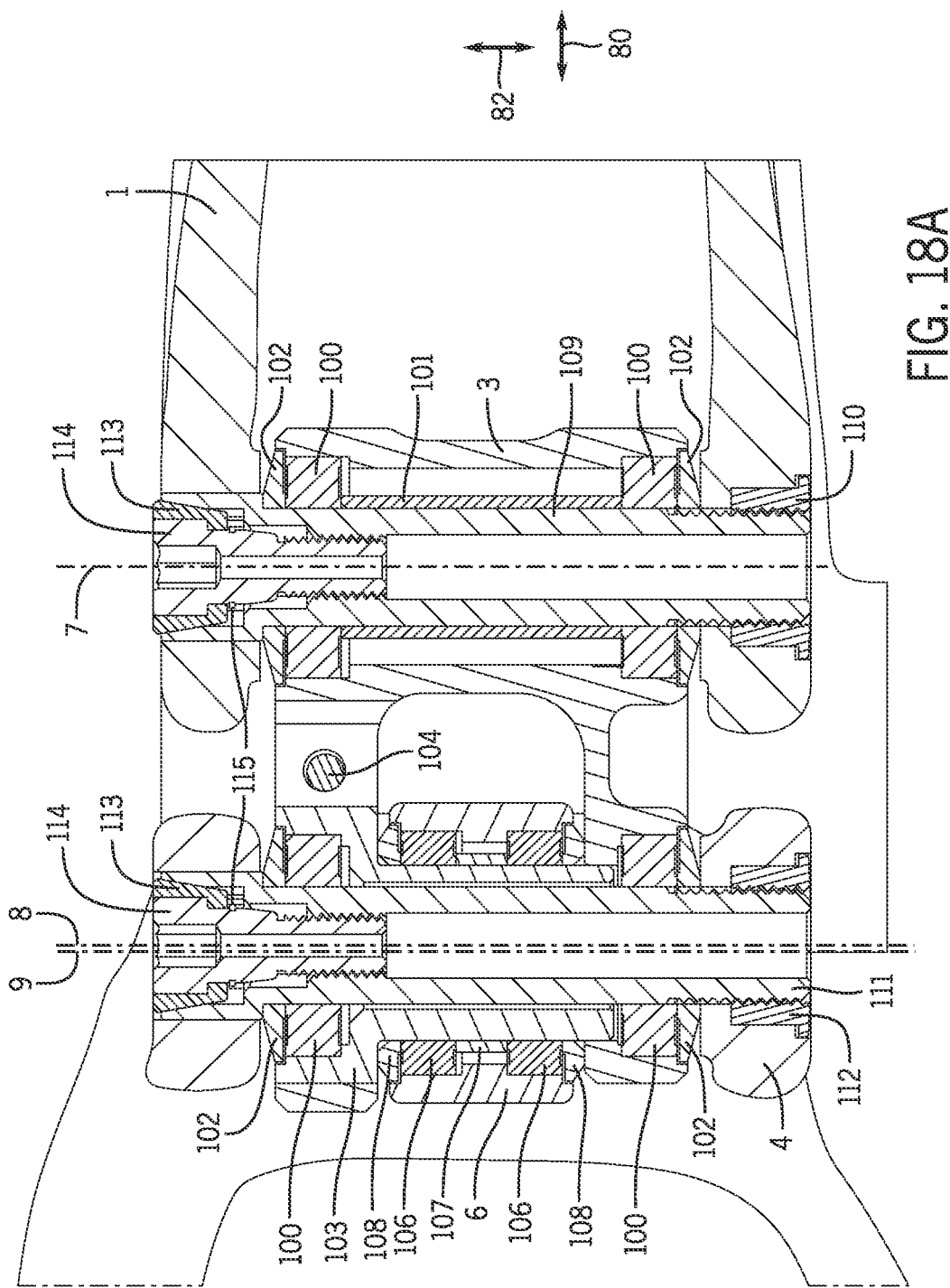
FIG. 18A is a cross section of FIG. 1B taken along section line B-B.

FIG. 18A is a cross section of FIG. 1B taken along section line B-B.

Figure 18B:
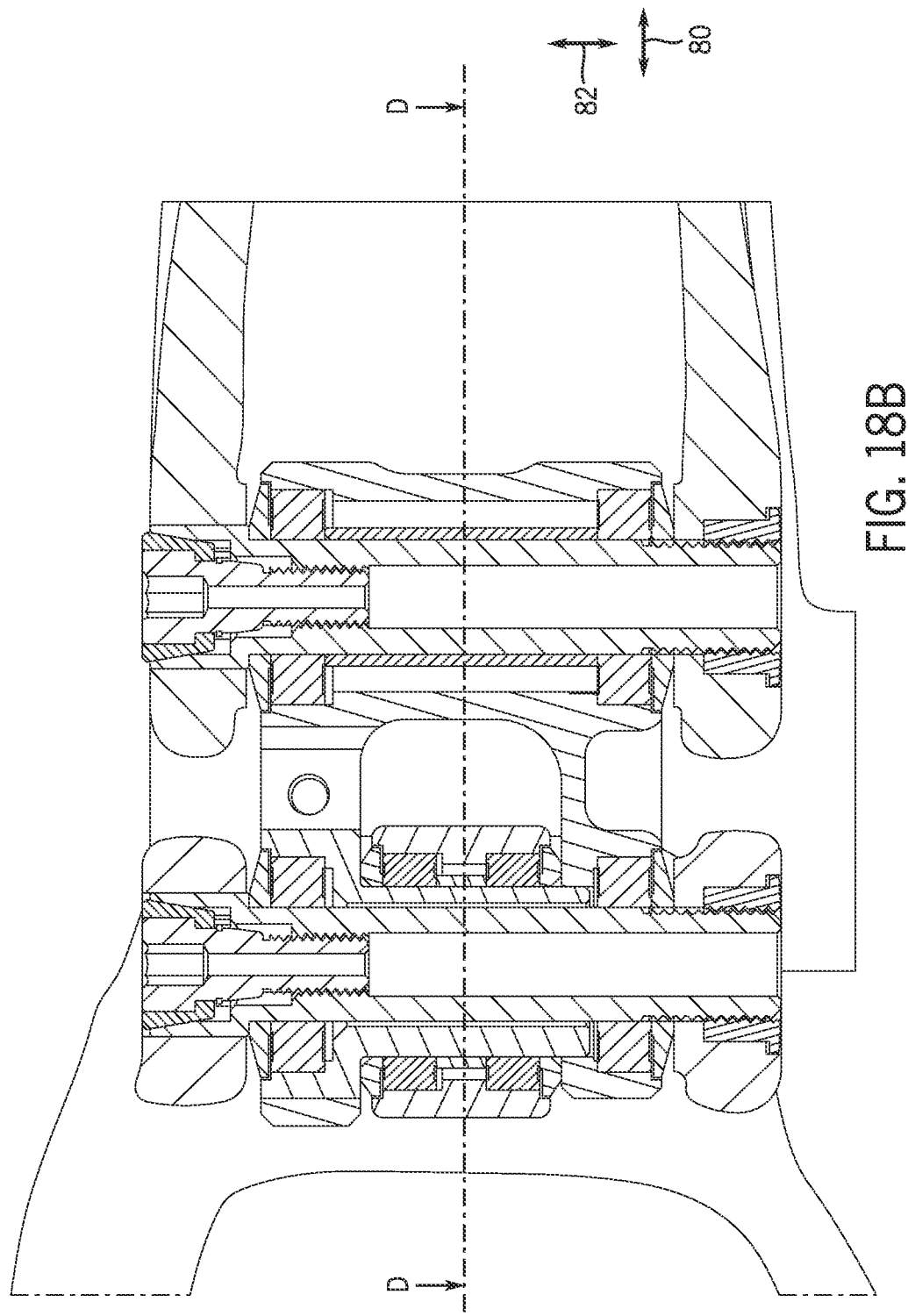
FIG. 18B is a cross section of FIG. 1B with noted cross section line D-D.

FIG. 18B is a cross section of FIG. 1B with noted cross section line D-D.

FIG. 18C is a cross section of FIG. 18B taken along section line D-D.

Figure 19A:
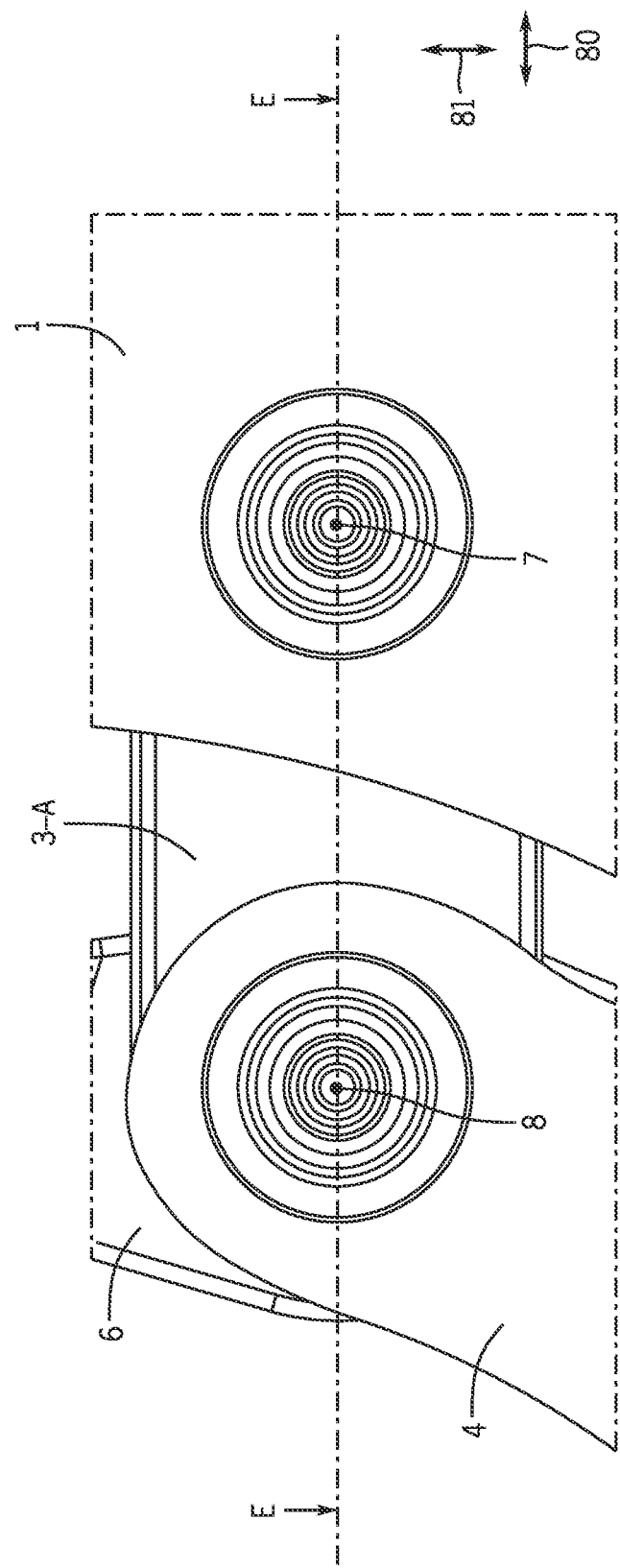
FIG. 19A shows detail view A of embodiment 2 with noted cross section line D-D.

FIG. 19A shows detail view A of embodiment 2 with noted cross section line E-E. In this embodiment link body-3 is composed of two parts 3-A and 3-B. 3-B is not shown in this figure.

Figure 19B:
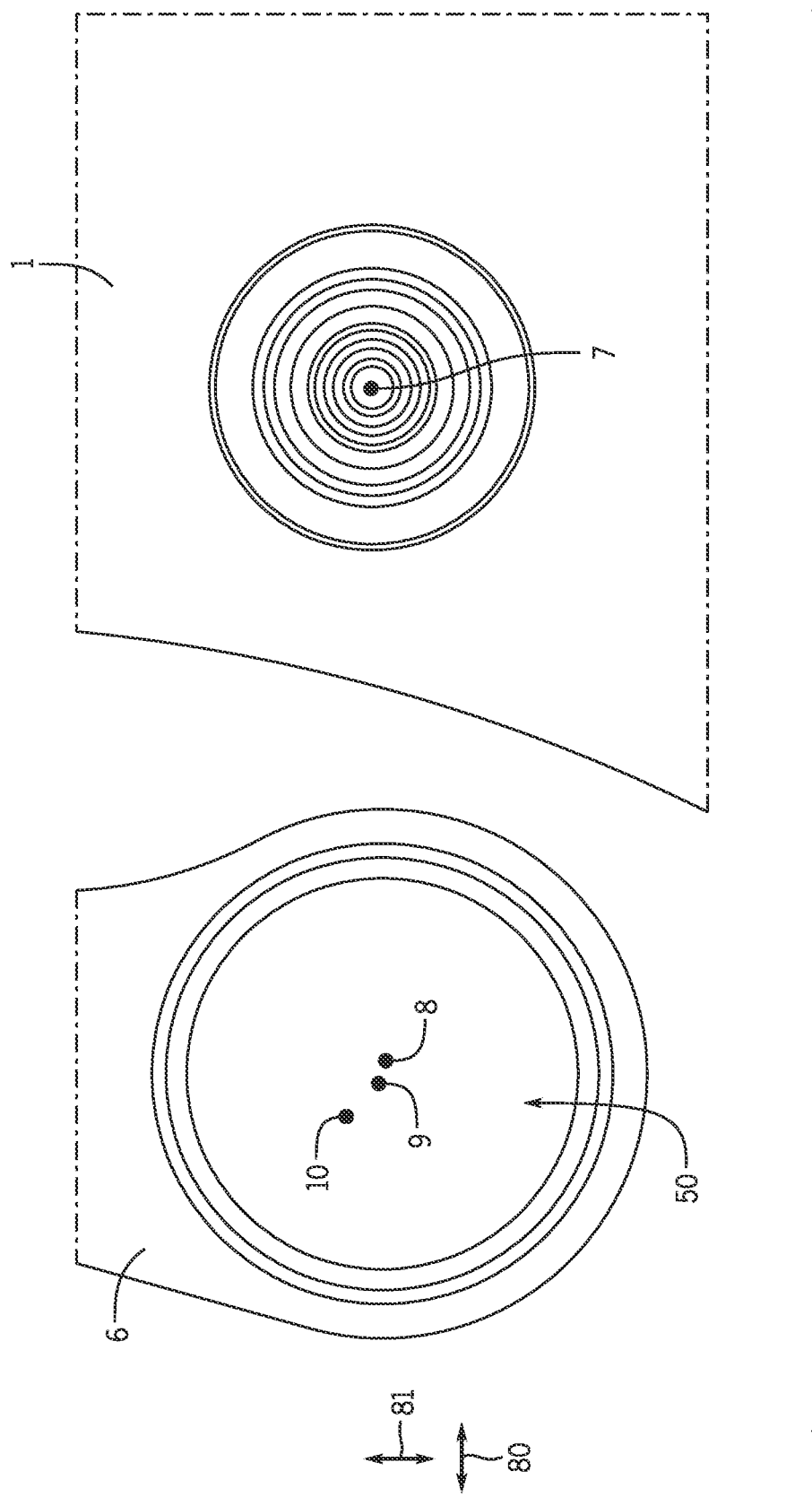
FIG. 19B shows detail view A of embodiment 2 with several bodies removed for clarity.

FIG. 19B shows detail view A of embodiment 2 with link body-3-A, link body-3-B, chain stay body-4 and several other bodies removed for clarity. Here suspended body-1, link body-6, are shown with link body-6 aperture 50. PIVC [1][3] 7, PIVC [3][4] 8, PIVC[3][6] 9 and IVC [4][6] 10 are also shown. Note that PIVC [3][4] 8, PIVC[3][6] 9 and IVC [4][6] 10 are not coincident, and are located within aperture 50.

Figure 20A:
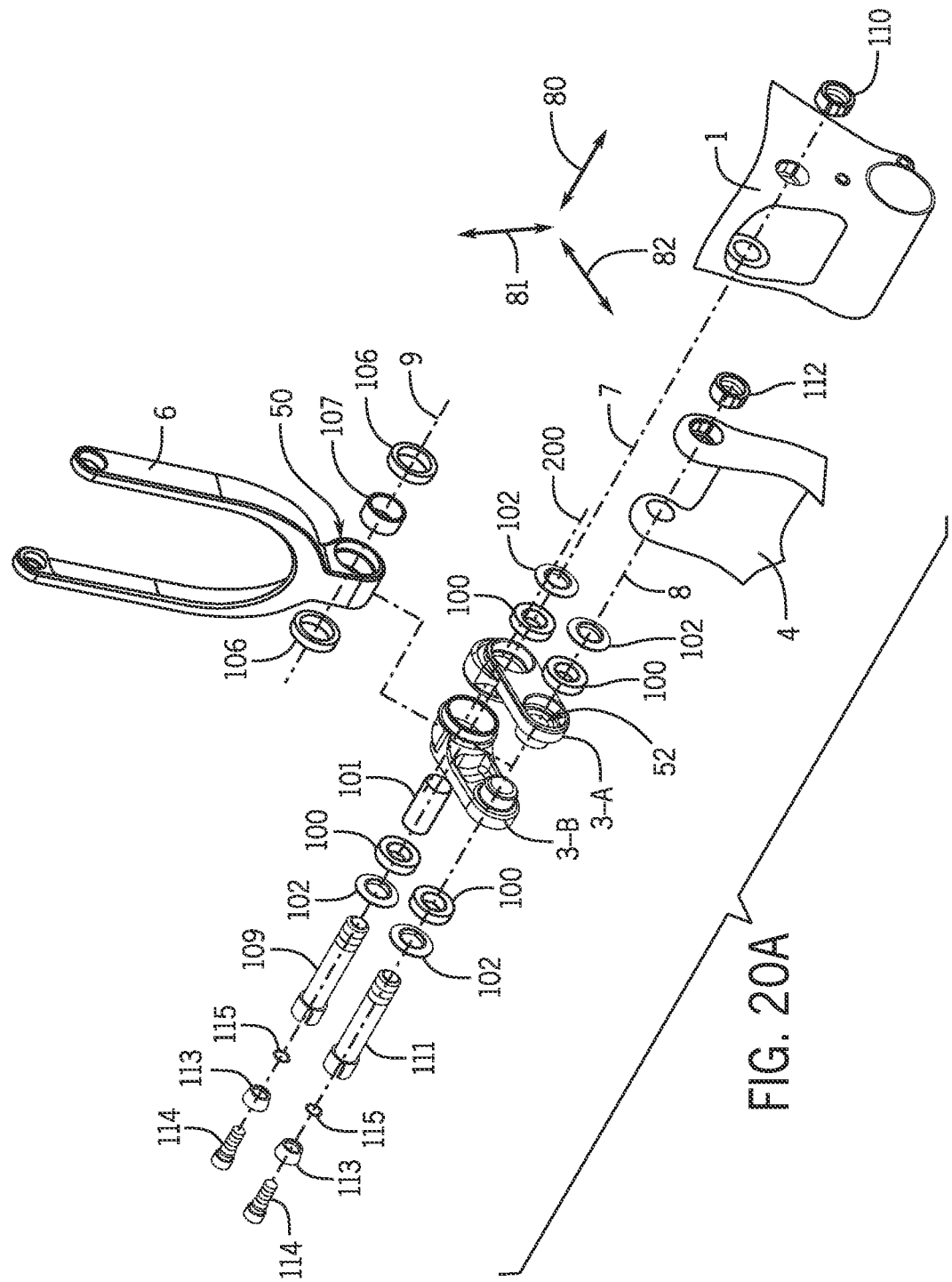
FIG. 20A shows an isometric exploded view of embodiment 2 with several bodies hidden for clarity.

FIG. 20A shows a cropped isometric exploded view of embodiment 2 with several bodies hidden for clarity. This figure shows the following linkage bodies: Suspended body-1, link body-3-A, link body-3-B, chain stay body-4 and link body-6. The lower pivot interface of linkage body-6 is concentric to the PIVC[3][6] 9 axis and houses a bearing 106 on either side of inner race spacer 107. Note that for clarity, identical parts in quantity are labeled with the same number. Also note that the word bearing is used which may be synonymous with a bushing or any other mechanism used to reduce friction at a joint. For instance, there are two bearings 106 housed in the lower portion of link body-6. These parts could be different in other embodiments.

Linkage body-3 is composed of two sides, link body-3-A and link body-3-B. Both link body-3-A and link body-3-B house a bearing 100 with an inner race extension 102 outside that are concentric to PIVC[1][3] 7 axis. Adjacent link body-3-A and link body-3-B interface together at a cylindrical feature with axis 200 that is offset from the PIVC[1] [3] 7 axis. On the other end, link body-3-A and link body-3-B each have cantilevered shaft extensions with outer diameters with an axis aligned with PIVC[3][6] 9 which is offset from PIVC[3][4] 8.

During sub-assembly, inner race spacer 101 is installed concentric to PIVC[1][3] 7 axis and between linkage body-3-A and linkage body-3-B. Simultaneously, the offset shaft extensions of linkage body-3-A and linkage body-3-B are inserted into the bearing assembly of linkage body-6 described above.

Next, chain stay body-4 is assembled to fit outside of PIVC[3][4] 8 axis end of the U-of combined link body-3-A and link body-3-B so that it is concentric to PIVC[3][4] 8. Axle fastener 111 then fits through all assembly parts concentric to PIVC[3][4] 8 and threads into keyed threaded nut 112 housed in chain stay body-4. After axle fastener 111 is torqued, collet wedge bolt 114 is inserted through the inside diameter of tapered collet wedge 113 and then spiral retaining ring 115 is installed onto collet wedge bolt 114. This allows collet wedge bolt 114 to rotate relative to tapered collet wedge 113, while being constrained axially. Finally, this sub assembly of collet bolt 114, collet wedge 113 and spiral retaining ring 115 is threaded into axle fastener 111 which has a matching taper with expansion slots. When torqued, the head of axle fastener 111 expands radially into the bore of chain stay body-4 and prevents the link body-3 assembly from moving axially as well as prevents the hardware from loosening.

Finally, the PIVC[1][3] 7 side of combined link body-3-A and link body-3-B is fitted into the female cavity in suspended body-1, and axle fastener 109 fits through all assembly parts concentric to PIVC [1][3] 7 and threads into keyed threaded nut 112 housed in suspended body-1. Then, collet wedge bolt 114 is inserted through the ID of tapered collet wedge 113 and then spiral retaining ring 115 is installed onto collet wedge bolt 114. This allows collet wedge bolt 114 to rotate relative to tapered collet wedge 113, while being constrained axially. Finally, this sub assembly of collet bolt 114, collet wedge 113 and spiral retaining ring 115 is threaded into axle fastener 109 which has a matching taper with expansion slots. When torqued, the head of axle fastener 109 expands radially into the bore of suspended body-1 and prevents the link body-3 assembly from moving axially as well as prevents the hardware from loosening.

The offset 202 between the PIVC[1][3] 7 axis and cylindrical feature axis 200, may prevent relative rotation of the link body-3-A and link body-3-B about the PIVC[1][3] 7 axis when axle fastener 109 is installed. This increases the rigidity of the system. Note that in other embodiments the offset 202 may not be included.

FIG. 20B shows an isometric exploded view of embodiment 2 with several bodies removed for clarity. When coupled, linkage body-3-A and linkage body-3-B form a support member that extends longitudinally in direction 80 and laterally in direction 81 with a first mechanical pivot axis 7 along the transverse direction 82 with bearing 100 as a pivot mechanism. Coupled linkage body-3-A and linkage body-3-B also has a second mechanical pivot axis 8 along the transverse direction 82 with bearing 100 as a pivot mechanism. Coupled linkage body-3-A and linkage body-3-B has a third mechanical pivot axis 9 along the transverse direction 82. Here, bearing 106 is the pivot mechanism which is shown previously in FIG. 20A. The pivot mechanism envelope defined by bearing 106 about axis 9 overlaps the pivot bearing mechanism defined by bearing 100 about axis 8 in the longitudinal and the lateral directions in this example which is more clearly seen in FIG. 19A.

Figure 20C:
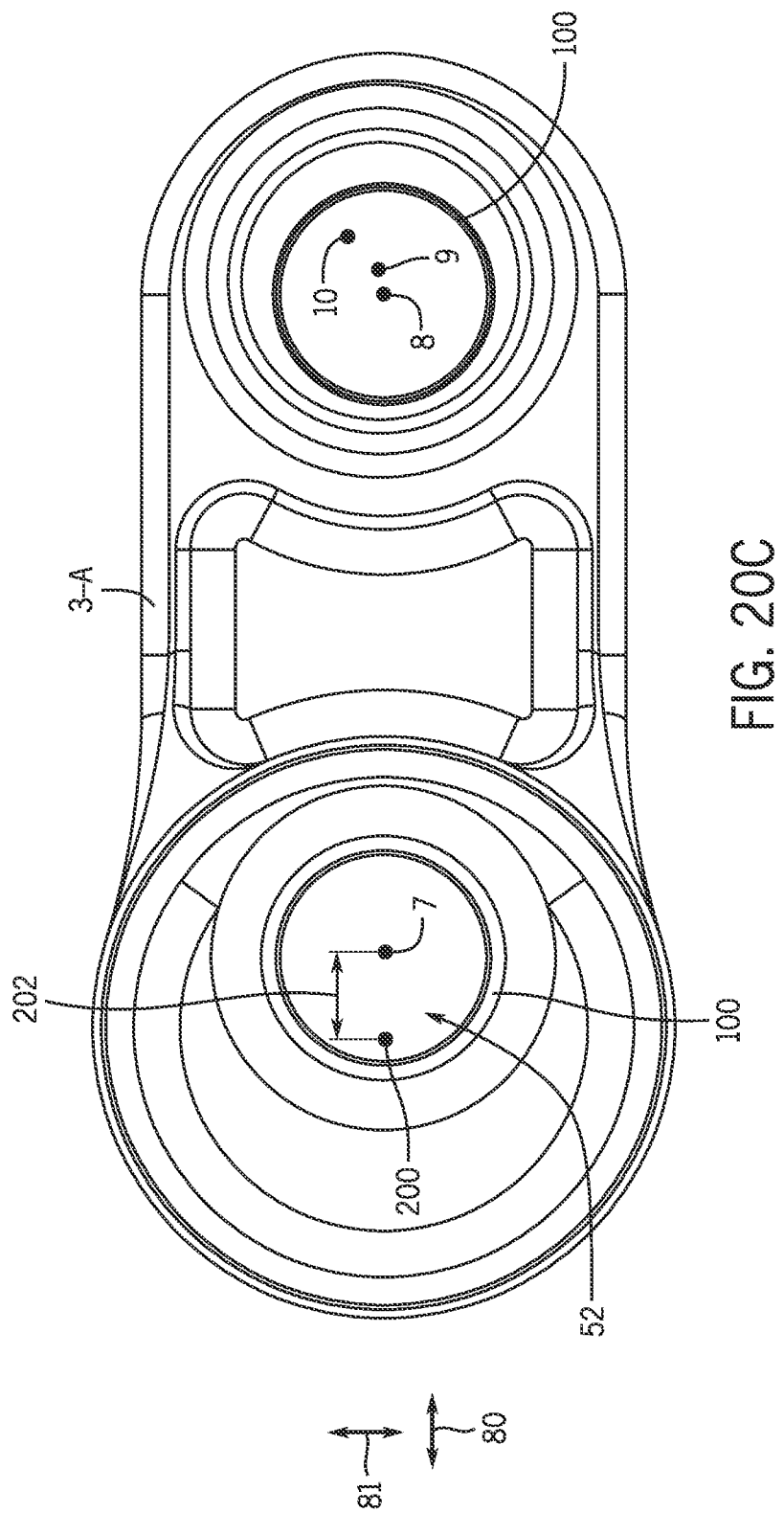
FIG. 20C shows a side view of linkage body-3A of embodiment 2

FIG. 20C shows a side view of linkage body-3A of embodiment 2.

Figure 21A:
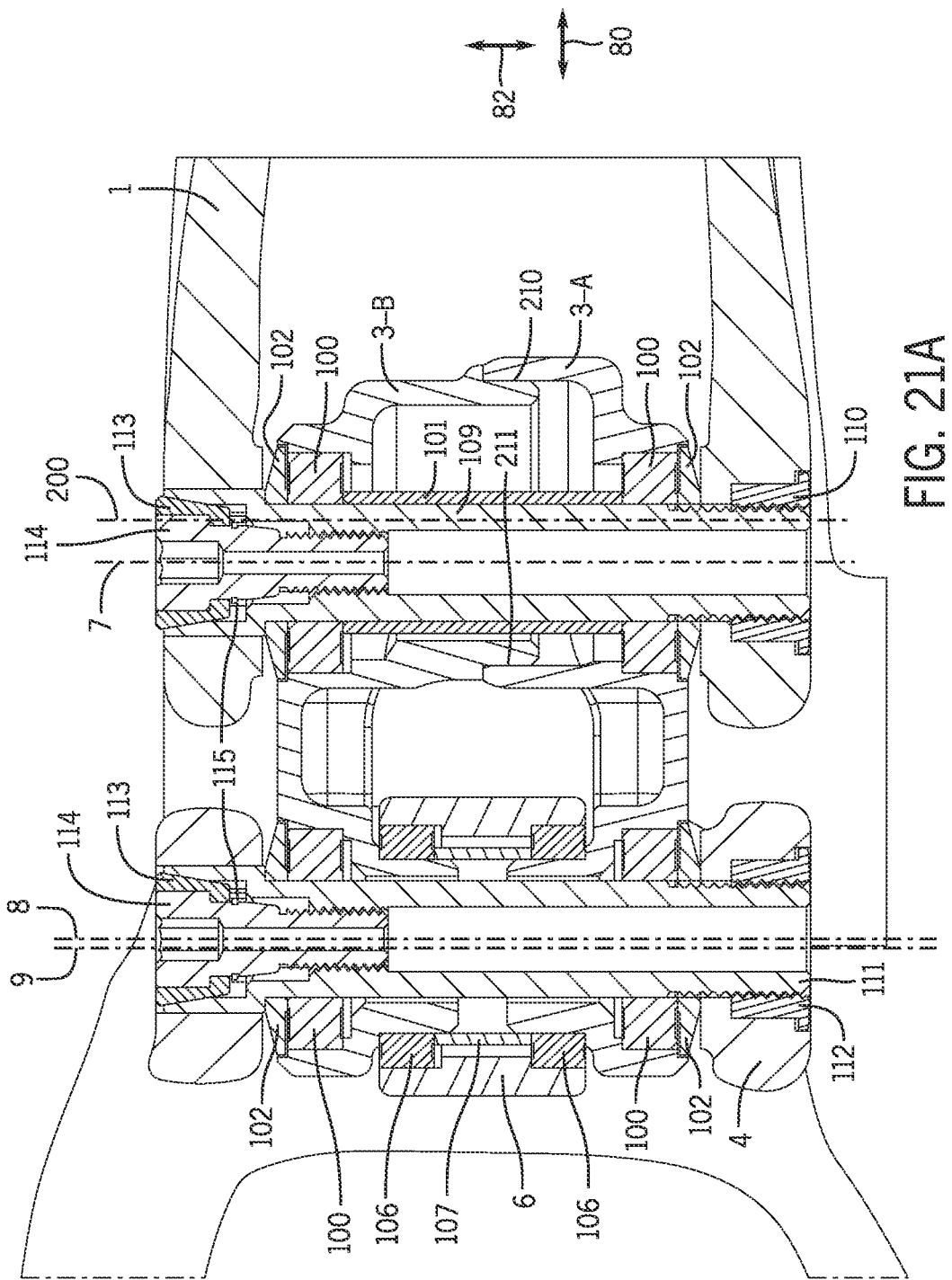
FIG. 21A is a cross section of FIG. 19A.

FIG. 21A is a cross section of FIG. 19A.

Figure 21B:
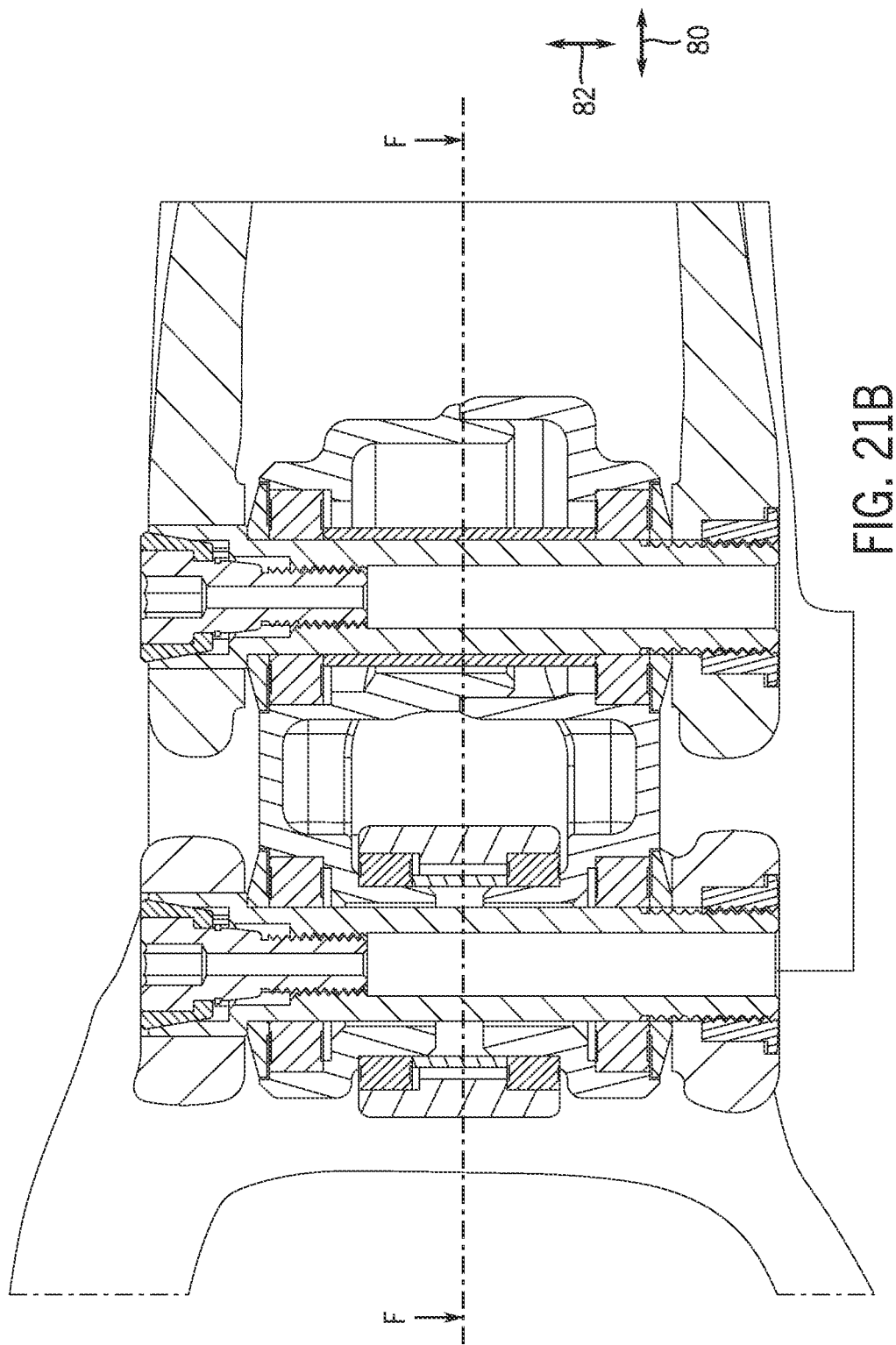
FIG. 21B is a cross section of FIG. 19A with noted cross section line F-F.

FIG. 21B is a cross section of FIG. 19A with noted cross section line F-F.

Figure 21C:
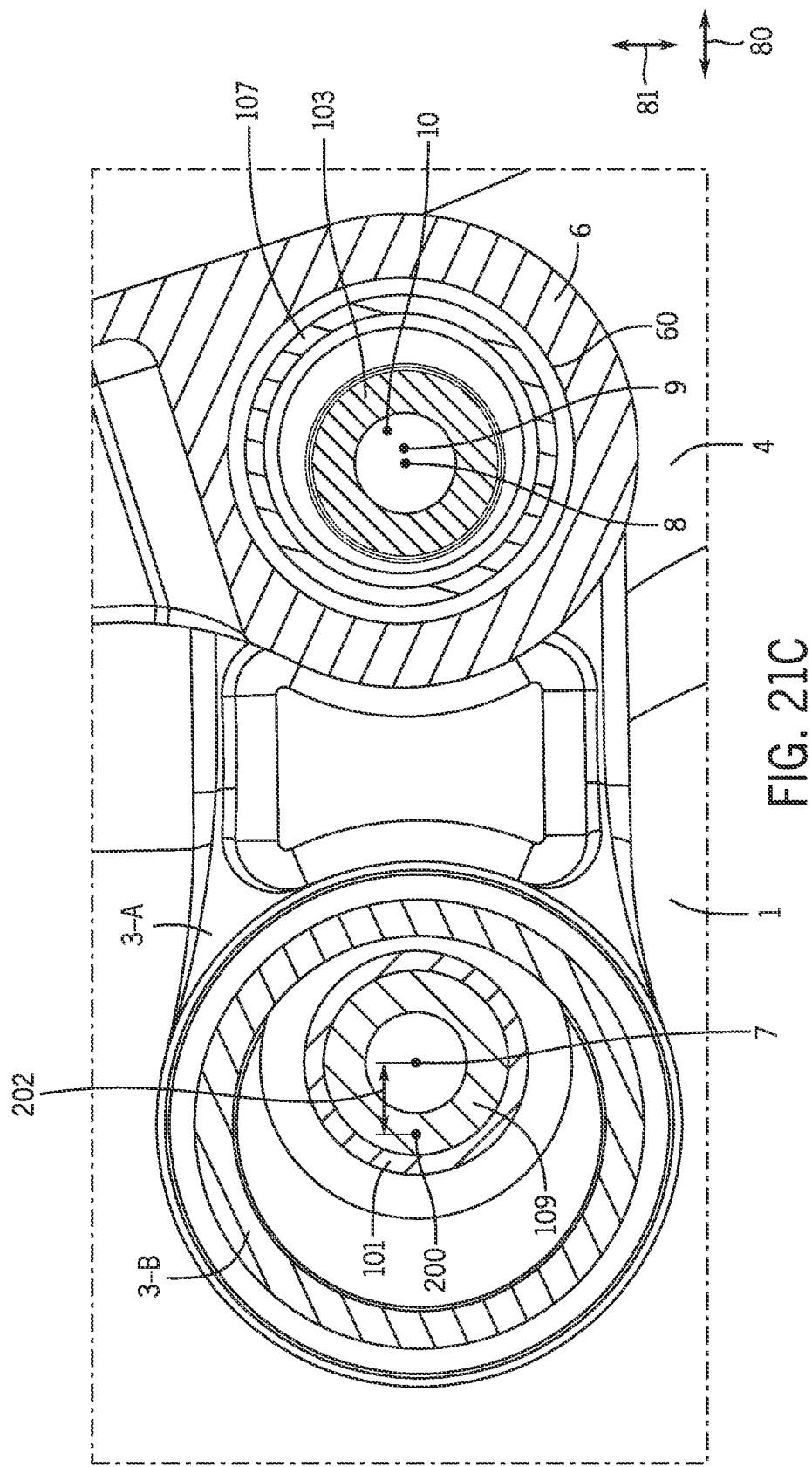
FIG. 21C is a cross section of FIG. 21B taken along section line F-F.

FIG. 21C is a cross section of FIG. 21B taken along section line F-F.

Figure 22:
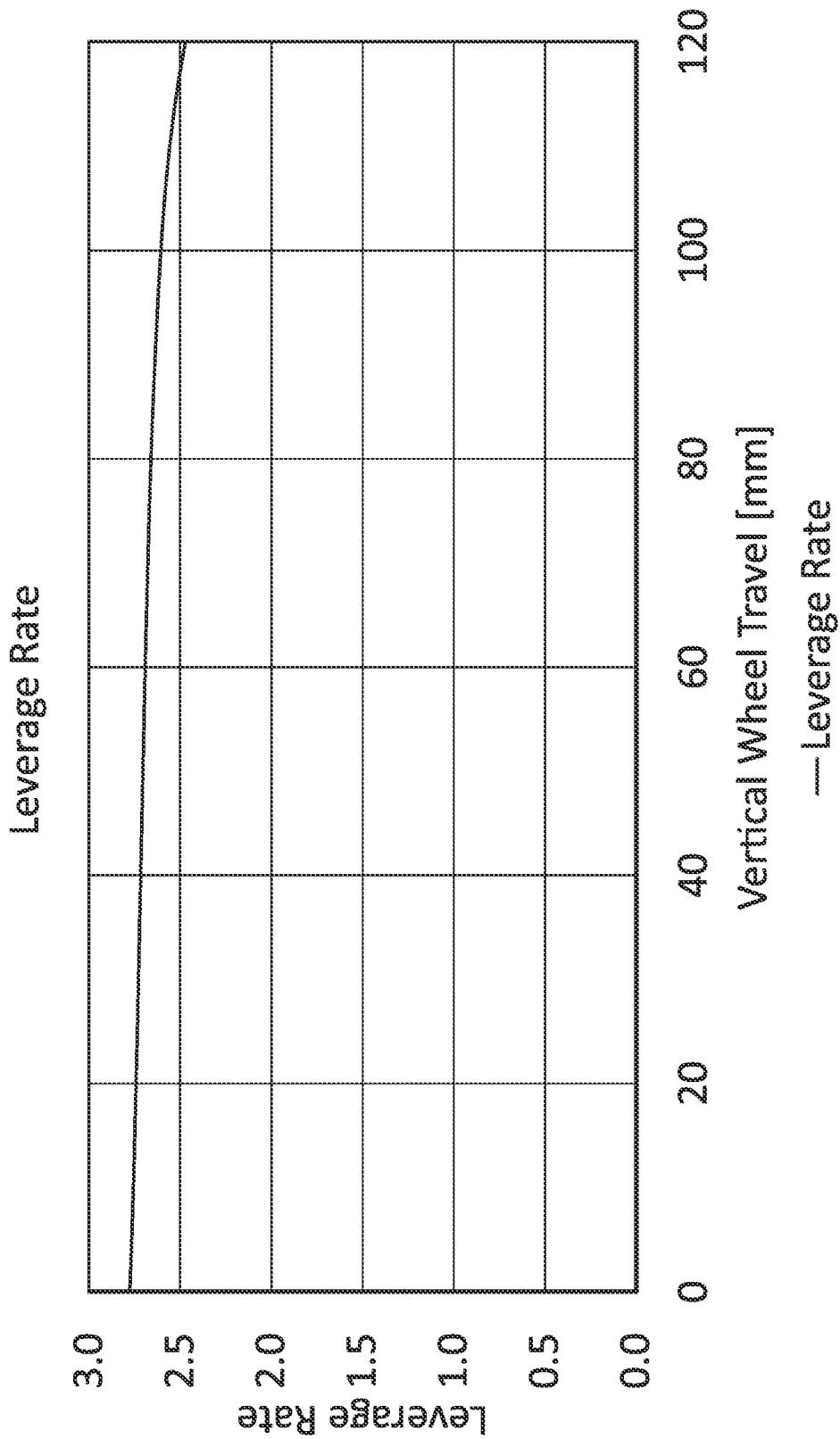
FIG. 22 is an example of a possible leverage rate curve with the suspension layout shown in FIG. 1A.

FIG. 22 is an example of a possible leverage rate curve with the suspension layout shown in FIG. 1A. The LR falls generally linear. This is preferred because the higher LR in the beginning of the travel helps improve small bump sensitivity, and the lower leverage rate at the end of the travel helps prevent harsh bottom outs. In addition, the general linear trend of the LR curve provides a supported mid-stroke and the aids in shock tuning as there are no dramatic changes in the LR.

Figure 23:
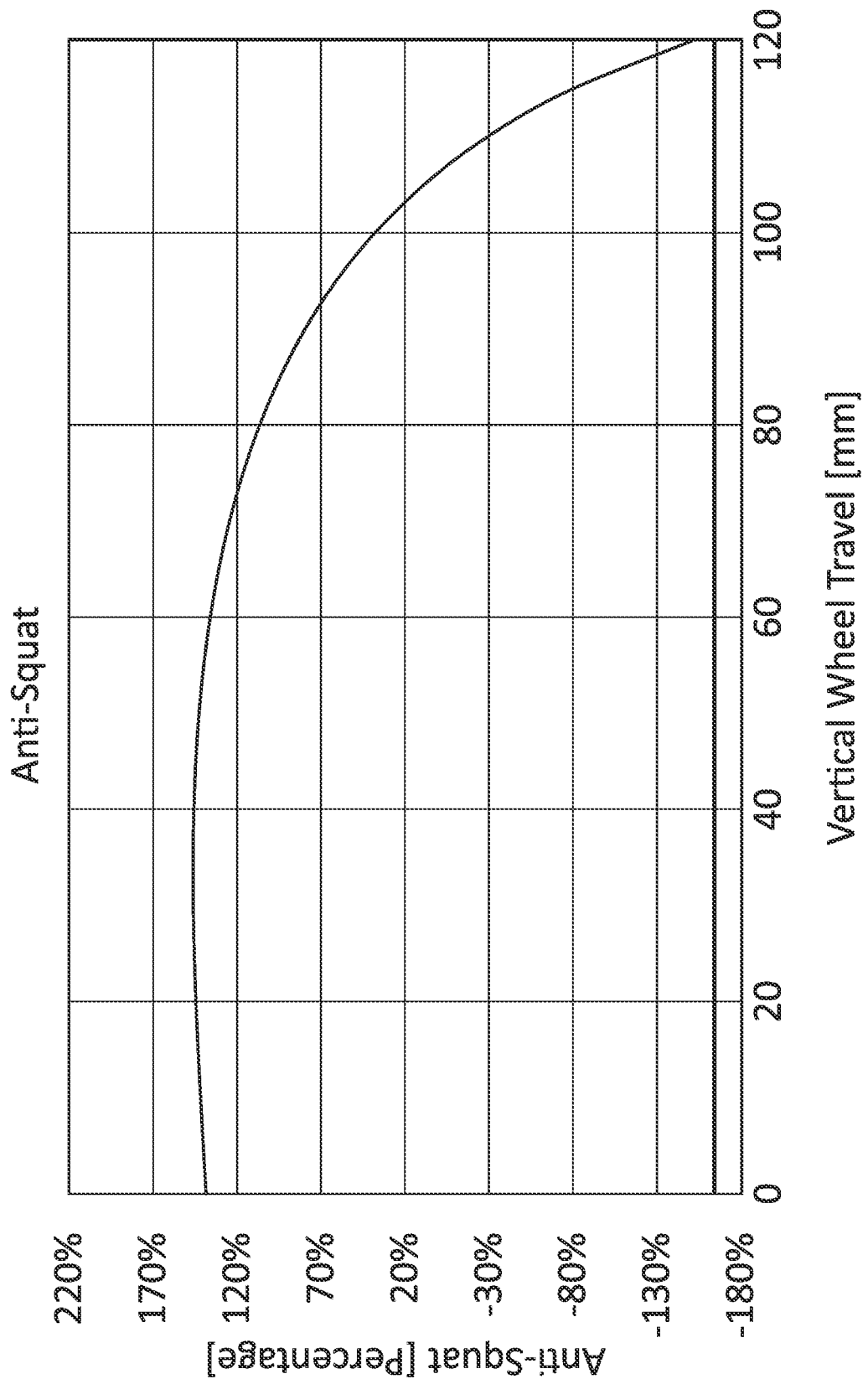
FIG. 23 is an example of a possible anti-squat curve with the suspension layout shown in FIG. 1A.

FIG. 23 is an example of a possible anti-squat curve with the suspension layout shown in FIG. 1A. The anti-squat curve provides a force opposing the weight transfer force in the early range of travel. This results in efficient power transfer during acceleration since energy is not being wasted to compress the shock/damper. There is then a quick drop off around to the compressed state. This is beneficial because continuing a similar, higher anti-squat percentage a detrimental in this portion of the travel since it would inhibit suspension compression from absorbing impacts.

Figure 24:
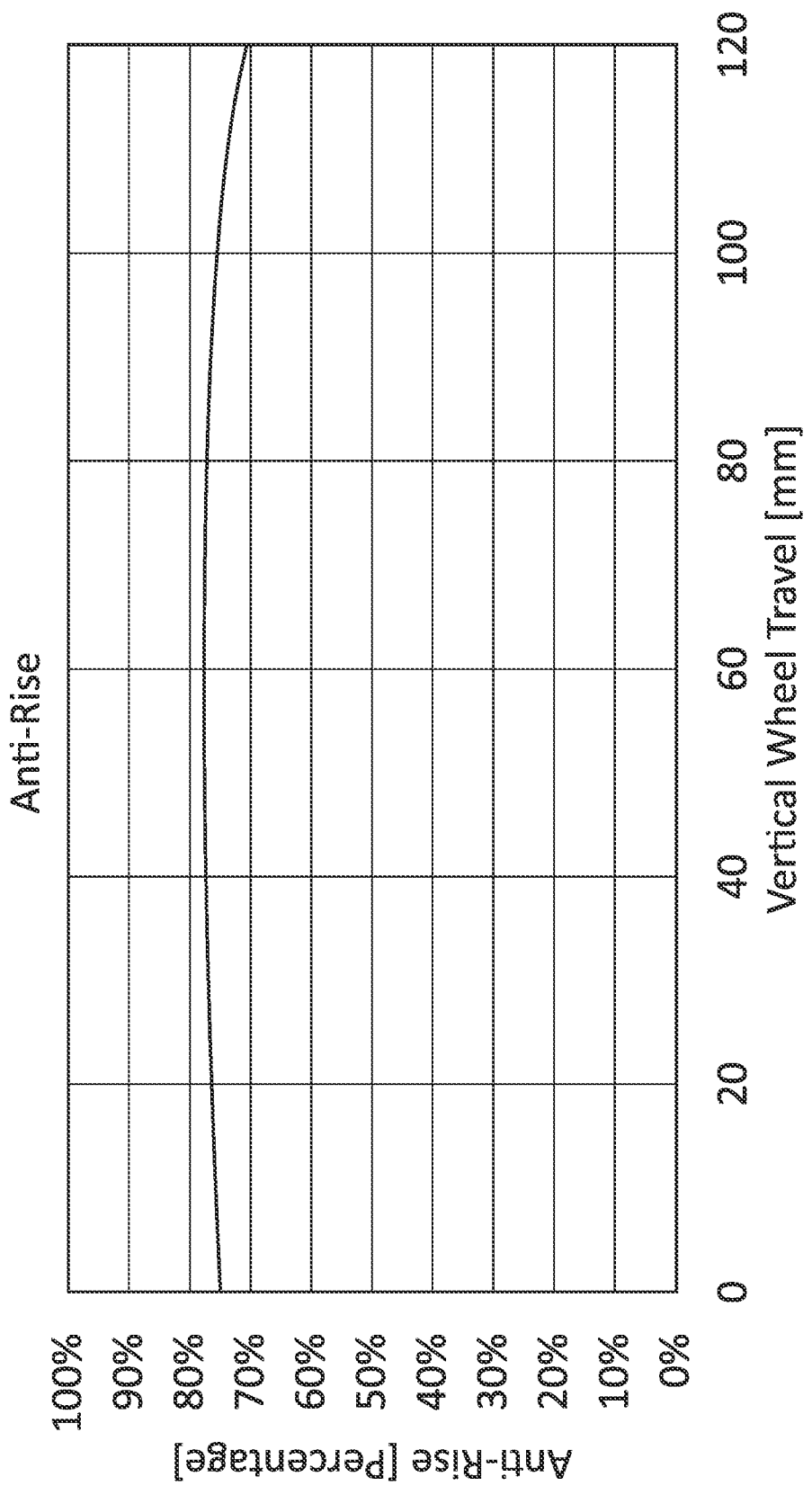
FIG. 24 is an example of a possible anti-rise curve with the suspension layout shown in FIG. 1A.

FIG. 24 is an example of a possible anti-rise curve with the suspension layout shown in FIG. 1A. The anti-squat remains in the 30-100% range which is ideal. Anti-rise less than 100% may help improve traction while anti-rise greater than 0% may help stabilize geometry during deceleration.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. For example, while some embodiments specify particular relationships between parts of the system, other relationships are contemplated. It is also contemplated that steps to any disclosed method may be performed in any order. It is intended that all matter contained in the above description and shown in the accompanying drawings shall be interpreted as illustrative only of particular embodiments and not limiting. Changes in detail or structure may be made without departing from the basic elements of the invention as defined in the following claims.

I claim:

1. A structure for constraining locations of three instantaneous velocity centers (IVCs) in a two-wheel vehicle having a shock and a suspension linkage, the suspension linkage comprising:
    a first body (3);
    a second body (6);
    a third body (4) operatively coupled with one another wherein:
    the first body (3) includes a jointed connection with the second body (6) defining an IVC[3][6] (9), and a jointed connection to the third body (4) defining an IVC[3][4] (8),
    the second body (6) is operatively coupled to the third body (4) defining an IVC[4][6] (10), wherein:
        the first body (3) includes a first aperture, having a common axis with the IVC[3][4] (8),
        the second body (6) includes a second aperture having a common axis of the IVC [3][6] (9),
        the IVC[3][4](8), the IVC[3][6] (9) and the IVC[4][6] (10) are located within one of the first aperture or the second aperture, and
        the IVC[3][4] (8), the IVC[3][6] (9), and the IVC [4][6] (10) are located in different positions from one another; and
    the shock operably coupled with the suspension linkage to resist movement of at least one of the first body (3), the second body (6), or the third body (4).

2. The structure of claim 1, wherein a size of the first aperture is different than a size of the second aperture.

3. The structure of claim 2, wherein the size of the first aperture is larger than the size of the second aperture.

4. The structure of claim 2, wherein the size of the second aperture is larger than the size of the first aperture.

5. The structure of claim 1, wherein the first body (3) comprises two link bodies coupled to one another to form a single, rigid body.

6. The structure of claim 5, wherein:
    the two link bodies each include respective first circular interfaces that define a first axis when the two link bodies are coupled together by the respective first circular interfaces,
    the two link bodies each include respective second circular interfaces that define a second axis offset from the first axis when the two bodies are coupled together by the respective first circular interfaces; and
    a fastener is coupled to the respective second circular interfaces through the second axis such that the two link bodies are keyed together as a single rigid body.

7. The structure of claim 5, wherein a first link body of the two link bodies includes a third aperture that defines the IVC[3][4] (8) and a second link body of the two link bodies includes a fourth aperture that defines the IVC[3][6] (9); wherein the second link body is keyed to the first link body to define a position of the IVC[3][4] (8) relative to the IVC[3][6] (9).

8. The structure of claim 1, wherein the first body (3) comprises a slotted portion defining a pair of deformable opposing jaws.

9. The structure of claim 8, wherein the opposing deformable jaws are configured to grip a shaft of a bearing.

10. The structure of claim 1, wherein one of the first body (3), the second body (6), or the third body (4) is a chain stay.

11. The structure of claim 1, wherein one of the first body (3), the second body (6), or the third body (4) is a suspended body.

* * * * *